(12) United States Patent
Na et al.

(10) Patent No.: US 12,432,473 B2
(45) Date of Patent: Sep. 30, 2025

(54) IMAGE SENSING DEVICE AND ELECTRIC APPARATUS INCLUDING THE SAME

(71) Applicant: SAMSUNG ELECTRONICS CO., LTD., Suwon-si (KR)

(72) Inventors: Ho Yong Na, Suwon-si (KR); Kyung Min Kim, Suwon-si (KR); Min Sun Keel, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 132 days.

(21) Appl. No.: 18/373,023

(22) Filed: Sep. 26, 2023

(65) Prior Publication Data

US 2024/0259711 A1    Aug. 1, 2024

(30) Foreign Application Priority Data

Feb. 1, 2023  (KR) .................. 10-2023-0013580
Mar. 14, 2023 (KR) .................. 10-2023-0033092

(51) Int. Cl.
*H04N 25/772* (2023.01)

(52) U.S. Cl.
CPC ............................. *H04N 25/772* (2023.01)

(58) Field of Classification Search
None
See application file for complete search history.

(56) References Cited

U.S. PATENT DOCUMENTS

| | | | |
|---|---|---|---|
| 7,075,049 B2 | 7/2006 | Rhodes et al. | |
| 7,550,793 B2 | 6/2009 | Itano et al. | |
| 10,044,960 B2 | 8/2018 | Mao et al. | |
| 10,134,788 B2 | 11/2018 | Lyu et al. | |
| 10,720,467 B2 | 7/2020 | Sugawa et al. | |
| 11,431,926 B2 | 8/2022 | Johnson | |
| 2016/0269666 A1* | 9/2016 | Guidash | H04N 25/77 |
| 2022/0272289 A1* | 8/2022 | Oh | H04N 25/585 |
| 2022/0337774 A1 | 10/2022 | Oh | |

\* cited by examiner

*Primary Examiner* — Mark T Monk
(74) *Attorney, Agent, or Firm* — Sughrue Mion, PLLC

(57) ABSTRACT

In some embodiments, an image sensing device includes a pixel array including a capacitor, a read circuit, and a plurality of pixels including a first and a second photodiode. The image sensing device further includes a driver configured to generate control signals for the plurality of pixels, an analog-to-digital converter (ADC) block configured to generate a digital signal, and a controller configured to control the driver and the ADC block. At least one of the plurality of pixels is configured to sequentially output a first and a second sub-output signal obtained by converting charges accumulated in the first photodiode, a third sub-output signal obtained by converting charges accumulated in the second photodiode, a fourth sub-output signal obtained by converting third charges stored in the capacitor, a first reset signal corresponding to the fourth sub-output signal, and a second reset signal corresponding to the third sub-output signal.

19 Claims, 18 Drawing Sheets

IMAGE SENSING DEVICE AND ELECTRIC APPARATUS INCLUDING THE SAME

CROSS-REFERENCE TO RELATED APPLICATIONS

This application claims benefit of priority under 35 U.S.C. § 119 to Korean Patent Application No. 10-2023-0013580, filed on Feb. 1, 2023, and to Korean Patent Application No. 10-2023-0033092, filed on Mar. 14, 2023, in the Korean Intellectual Property Office, the disclosures of which are incorporated by reference herein in their entireties.

BACKGROUND

1. Technical Field

The present disclosure relates generally to semiconductor devices, and more particularly, to an image sensing device and an electronic apparatus including the same.

2. Description of the Related Art

An image sensing device may be and/or may include a semiconductor device that that may convert optical information into an electrical signal. For example, the image sensing device may be and/or may include a complementary metal-oxide semiconductor (CMOS) image sensor. For another example, the image sensor may include a plurality of pixels that may be arranged in a two-dimensional (2D) structure. Alternatively or additionally, each pixel of the plurality of pixels may include at least one photodiode. Each photodiode may convert an amount of incident light into an electrical signal.

Recently, image sensors may have been used in electronic devices, such as, but not limited to, mobile devices (e.g., smartphones), as well as, in surveillance cameras and/or vehicles. Consequently, an image sensor may need to secure a high dynamic range in order to express bright areas and/or dark areas in a single image at a same time. Thus, there exists a need for further improvements in image sensors, as the need to simultaneously express a high illumination environment (e.g., in which the sun is strong) and a low illumination environment (e.g., a tunnel) may be constrained by a dynamic range of the image sensor.

SUMMARY

Aspects of the present disclosure provide for an image sensing device capable of securing an image of a relatively high dynamic range.

Aspects of the present disclosure provide for an image sensing device with a relatively high dynamic range and an electronic apparatus for controlling an operation mode of the image sensing device.

However, aspects of the present disclosure are not restricted to those set forth herein. The above and other aspects of the present disclosure may become apparent to one of ordinary skill in the art to which the present disclosure pertains by referencing the detailed description of the present disclosure.

According to an aspect of the present disclosure, an image sensing device is provided. The image sensing device includes a pixel array including a plurality of pixels, a capacitor, and a read circuit. The plurality of pixels includes a first photodiode and a second photodiode. The capacitor is coupled to the second photodiode. The image sensing device further includes a driver configured to generate control signals transmitted to the plurality of pixels. The image sensing device further includes an analog-to-digital converter (ADC) block configured to generate a digital signal by comparing output signals of the plurality of pixels with a ramp signal. The image sensing device further includes a controller configured to control operations of the driver and the ADC block. A first light receiving area of the first photodiode is larger than a second light receiving area of the second photodiode. At least one pixel of the plurality of pixels is configured to sequentially output a first sub-output signal obtained by converting first charges accumulated in the first photodiode with a first conversion gain, a second sub-output signal obtained by converting the first charges accumulated in the first photodiode with a second conversion gain, a third sub-output signal obtained by converting second charges accumulated in the second photodiode with a third conversion gain, a fourth sub-output signal obtained by converting third charges stored in the capacitor with a fourth conversion gain, a first reset signal corresponding to the fourth sub-output signal, and a second reset signal corresponding to the third sub-output signal.

According to an aspect of the present disclosure, an image sensing device is provided. The image sensing device includes a pixel array including a plurality of pixels, a capacitor, and a read circuit. The plurality of pixels includes a first photodiode and a second photodiode. A second light receiving area of the second photodiode is smaller than a first light receiving area of the first photodiode. The capacitor is coupled to the second photodiode. The image sensing device further includes a driver configured to generate control signals transmitted to the plurality of pixels. The image sensing device further includes an ADC block configured to generate a digital signal by comparing output signals of the plurality of pixels with a ramp signal. The image sensing device further includes a controller configured to control operations of the driver and the ADC block. The image sensing device further includes an operation mode setting register. The controller is configured to generate control signals for controlling the driver and the ADC block according to a setting value of the operation mode setting register. The controller is configured to control, when the setting value corresponds to a first operation mode, at least one pixel of the plurality of pixels to sequentially output a first sub-output signal obtained by converting first charges accumulated in the first photodiode with a first conversion gain, a second sub-output signal obtained by converting the first charges accumulated in the first photodiode with a second conversion gain, a third sub-output signal obtained by converting second charges accumulated in the second photodiode with a third conversion gain, a fourth sub-output signal obtained by converting third charges stored in the capacitor with a fourth conversion gain, a first reset signal corresponding to the fourth sub-output signal, and a second reset signal corresponding to the third sub-output signal.

According to an aspect of the present disclosure, an electronic apparatus is provided. The electronic apparatus includes an image sensing device configured to sense incident light and to output a digital image signal, and an application processor configured to receive the digital image signal from the image sensing device in units of frames and to set an operation mode of the image sensing device. The image sensing device includes a pixel array including a plurality of pixels, a capacitor, and a read circuit. The plurality of pixels includes a first photodiode and a second photodiode. A second light receiving area of the second photodiode is smaller than a first light receiving area of the first photodiode. The capacitor is coupled to the second photodiode. The pixel array is configured to output an output signal including a plurality of sub-output signals and a plurality of reset signals in response to control signals. The image sensing device further includes an ADC block configured to receive the output signal, a mode setting register, and a controller. The application processor is further configured to set a setting value in the mode setting register. The controller is configured to change, according to the setting value, an output order of the plurality of sub-output signals and the plurality of reset signals related to the second photodiode output from the pixel array.

Additional aspects may be set forth in part in the description which follows and, in part, may be apparent from the description, and/or may be learned by practice of the presented embodiments

BRIEF DESCRIPTION OF THE DRAWINGS

The above and other aspects, features, and advantages of certain embodiments of the present disclosure may become more apparent from the following description taken in conjunction with the accompanying drawings, in which.

DETAILED DESCRIPTION OF THE EMBODIMENTS

Figure 1:
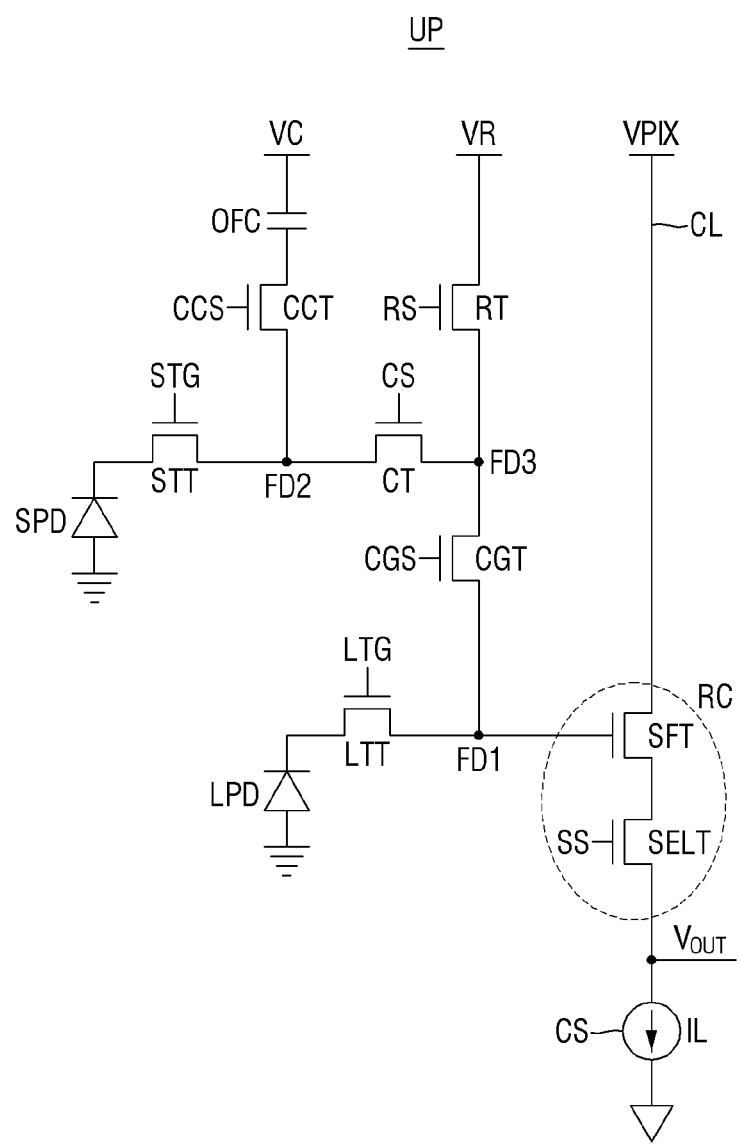
FIG. 1 is a circuit diagram of a unit pixel, according to some exemplary embodiments.

Since exemplary embodiments according to the present disclosure disclosed herein may be applied with various changes and have various forms, the exemplary embodiments are illustrated in the drawings and described in detail herein. However, this is not intended to limit the exemplary embodiments according to the present disclosure to specific disclosed forms, and includes all modifications, equivalents, or substitutes included in the spirit and scope of the present disclosure.

Terms such as first or second may be used to describe various components, but the components should not be limited by the terms. The terms may be used only to distinguish one component from another component. For example, a 'first' component may be referred to as a 'second' component and a 'second' component may be similarly referred to as a 'first' component, without departing from the scope of the present disclosure.

It is to be understood that when one component is referred to as being "connected to" or "coupled to" another component, one component may be directly connected or coupled to another component, but other components may exist therebetween. On the other hand, it is to be understood that when one component is referred to as being "connected directly to" or "coupled directly to" another component, other components do not exist therebetween. Other expressions describing a relationship between the components, that is, "between", "directly between", "adjacent to", "directly adjacent to" and the like, may be similarly interpreted.

Terms used in this specification are used only to describe specific exemplary embodiments, and are not intended to limit the present disclosure. Singular expressions include plural expressions unless the context clearly dictates otherwise. In this specification, it is to be understood that terms such as "comprise" or "having" are intended to indicate that the features, numbers, steps, operations, components, parts, or combinations thereof described in this specification exist, and do not preclude the presence or addition of one or more other features, numbers, steps, operations, components, parts, or combinations thereof.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Hereinafter, various exemplary embodiments of the present disclosure are described with reference to the accompanying drawings.

FIG. 1 is a circuit diagram of a unit pixel of an image sensing device to which some exemplary embodiments are applied.

Referring to FIG. 1, a unit pixel UP may include a first photodiode LPD, a second photodiode SPD, a read circuit RC, an overflow capacitor OFC, and a plurality of transistors (e.g., a connection transistor CT, a capacitor connection transistor CCT, a reset transistor RT, and a conversion gain transistor CGT).

The first photodiode LPD and the second photodiode SPD may be and/or may include photodiodes having different sizes. For example, the first photodiode LPD may have a relatively larger light-receiving area than the second photodiode SPD. Since the light-receiving area of the first photodiode LPD may be large, the first photodiode LPD may generate more charges than the second photodiode SPD under the same light-receiving condition. That is, the first photodiode LPD may have a higher sensitivity than the second photodiode SPD, and may generate a pixel output signal that may be effective at a lower illumination. Alternatively or additionally, the second photodiode SPD may generate a pixel output signal that may be effective at a high illumination. Hereinafter, for convenience of explanation, the description may be made under the assumption that the unit pixel UP includes at least two photodiodes having different sizes. However, the present disclosure is not limited thereto, and the unit pixel UP may include a plurality of photodiodes having different light-receiving areas. For example, the first photodiode LPD may have a relatively larger light-receiving area than the second photodiode SPD.

In an embodiment, the first photodiode LPD may be connected (e.g., coupled) to a first node FD1, which may be at least part of a first floating area, through a first transfer transistor LTT. Alternatively or additionally, the second photodiode SPD may be connected (e.g., coupled) to a second node FD2, which may be at least part of a second floating area, through a second transfer transistor STT. The charges generated by the first photodiode LPD and the second photodiode SPD may be transferred to the corresponding floating nodes FD1 and FD2 through the transfer transistors LTT and STT based on transfer control signals (e.g., first transfer control signal LTG and second transfer control signal STG).

As shown in FIG. 1, the read circuit RC may include a source follower transistor SFT and a select transistor SELT. The source follower transistor SFT may operate as a source follower amplifier based on a bias current IL generated by a current source CS connected to a column line CL. Alternatively or additionally, the source follower transistor SFT may output a voltage corresponding to the charges transferred to the first node FD1 to the column line CL as an output signal Vout through the selection transistor SELT.

The overflow capacitor OFC may be positioned between a capacitor voltage VC node and a capacitor connection transistor CCT. For example, the overflow capacitor OFC may be connected to the second node FD2 through the capacitor connection transistor CCT, according to a capacitor connection control signal CCS. Consequently, the charges generated from the second photodiode SPD during an exposure operation may overflow to the second node FD2 through the second transfer transistor STT. Alternatively or additionally, the overflowed charges may be accumulated in the overflow capacitor OFC through the capacitor connection transistor CCT.

The plurality of transistors may include the connection transistor CT, the capacitor connection transistor CCT, the reset transistor RT, and the conversion gain transistor CGT.

The connection transistor CT may be positioned between the second node FD2 and a third node FD3, which may be at least part of a third floating area. The connection transistor CT may connect the second node FD2 and the third node FD3, according to a connection control signal CS. When the connection transistor CT is turned on, capacitances of the second node FD2 and the third node FD3 may be connected in parallel. In order for the charges overflowed from the second photodiode SPD through the second transfer transistor STT to be accumulated in the overflow capacitor OFC through the capacitor connection transistor CCT, a threshold voltage of the connection transistor CT may be higher than a threshold voltage of the capacitor connection transistor CCT.

The reset transistor RT may be positioned between a reset voltage VR node and the third node FD3. The reset transistor RT may reset charges accumulated in at least one of the second node FD2, the first node FD1, the third node FD3, and the overflow capacitor OFC, according to a reset control signal RS.

The conversion gain transistor CGT may be positioned between the first node FD1 and the third node FD3. The conversion gain transistor CGT may connect the first node FD1 and the third node FD3, according to a conversion gain control signal CGS. When the conversion gain transistor CGT is turned on, the first node FD1 and the third node FD3 may be connected to each other to increase a capacitance and decrease a conversion gain. That is, when the conversion gain transistor CGT is turned on, an operation may be performed in a low conversion gain (LCG) mode. Alternatively or additionally, when the conversion gain transistor CGT is turned off, an operation may be performed in a high conversion gain (HCG) mode.

The conversion gain may refer to a rate at which a voltage of a floating diffusion node may be converted by charges transferred to the floating diffusion node. For example, in a state in which the amount of charge to be transferred may be the same, the conversion gain may vary according to a capacitance of the floating diffusion node. That is, when the capacitance of the floating diffusion node increases, the conversion gain may decrease. Alternatively or additionally, when the capacitance of the floating diffusion node decreases, the conversion gain may increase. In an embodiment, the unit pixel UP may operate with at least a dual conversion gain. That is, the dual conversion gain may include a low conversion gain (LCG) and a high conversion gain (HCG). Since the HCG may have a higher rate at which a charge may be converted to a voltage, the HCG may be applied to an operation of generating a pixel signal corresponding to a lower illumination than the LCG.

In an embodiment, a first sub-output signal (e.g., SO1 of FIG. 6), that may have been obtained by converting charges generated by the first photodiode LPD in an exposure operation section with a first conversion gain, when in a state in which the conversion gain transistor CGT is turned off, may be output through the read circuit RC. In an optional or additional embodiment, a second sub-output signal (e.g., SO2 of FIG. 6), that may have been obtained by converting the charges generated by the first photodiode LPD with a second conversion gain, when in a state in which the conversion gain transistor CGT may be turned on, may be output through the read circuit RC. Since the first conversion gain may be formed only by the capacitance of the first node FD1 and/or the second conversion gain may be formed by the sum of the capacitances of the first node FD1 and the second node FD2, a size of the first conversion gain may be greater than a size of the second conversion gain. That is, it may be advantageous to generate an output signal with a higher first conversion gain assuming that the amount of charge generated may be small in a low illumination environment.

In an embodiment, a third sub-output signal (e.g., SO3 of FIG. 6), that may have been obtained by converting charges accumulated in the second photodiode SPD among the charges generated in the second photodiode SPD in the exposure operation section with a third conversion gain, may be output through the read circuit RC, in a state in which the connection transistor CT and the conversion gain transistor CGT may be turned on. A fourth sub-output signal (e.g., SO4 of FIG. 6), that may have been obtained by converting charges generated by the second photodiode SPD in the exposure section, may have been overflowed to the third node FD3 through the second transfer transistor STT, and/or may have been accumulated in the overflow capacitor OFC through the capacitor connection transistor CCT with a fourth conversion gain, may be output through the read circuit RC in a state in which the capacitor connection transistor CCT, the connection transistor CT, and the conversion gain transistor CGT may be turned on. Since the third conversion gain may be formed by the sum of the capacitances of the first node FD1, the second node FD2, and the third node FD3 and the fourth conversion gain may be formed by the sum of the capacitances of the first node FD1, the second node FD2, and the third node FD3, and the overflow capacitor OFC, the third conversion gain may be greater than the fourth conversion gain. That is, sensing a signal with the fourth conversion gain at a brightness of high illumination may be more advantageous than sensing a signal with the third conversion gain.

In some exemplary embodiments, a capacitor voltage VC, a reset voltage VR, and a pixel voltage VPIX may have the same level. Alternatively or additionally, the capacitor voltage VC, the reset voltage VR, and the pixel voltage VPIX may have different levels.

When the image sensing device using the unit pixel UP of FIG. 1 is used for a vehicle, a long exposure operation section (e.g., 11 milliseconds (ms) or more) may be required to prevent a phenomenon in which traffic lights may not be recognized due to flicker of light emitting diode (LED) traffic lights (e.g., 90 Hertz (Hz) or higher). The first photodiode LPD and the second photodiode SPD included in the unit pixel UP may sequentially generate the first to fourth sub-output signals (e.g., SO1 to SO4 of FIG. 6) using the charges generated in a long exposure section (e.g., 11 ms). The first and second sub-output signals (e.g., SO1 and SO2 of FIG. 6) may be advantageous in securing low illumination environment performance by using a high sensitivity capability of the first photodiode LPD, and the third and fourth sub-output signals (e.g., SO3 and SO4 of FIG. 6) may secure a high illumination environment by using low sensitivity of the second photodiode SPD and a large charge storage capability of the overflow capacitor OFC.

Figure 2:
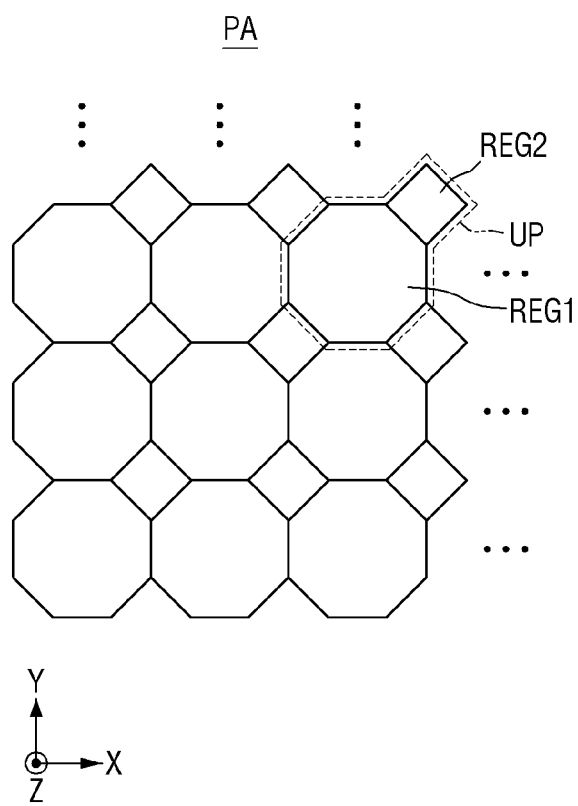
FIG. 2 is a plan view of a portion of a pixel array constituted by unit pixels of FIG. 1, according to some exemplary embodiments.

FIG. 2 is a plan view of a portion of a pixel array constituted by unit pixels of FIG. 1, according to some exemplary embodiments.

Referring to FIG. 2, a pixel array PA may include a plurality of unit pixels UP. The plurality of unit pixels UP may be regularly arranged in a first direction X and a second direction Y. The unit pixel UP may include a first region REG1 and a second region REG2 adjacent to the first region REG1. In an embodiment, an area of the first region REG1 may be greater than an area of the second region REG2. For example, the area of the first region REG1 may be more than two times greater than the area of the second region REG2. As shown in FIG. 2, the first region REG1 may have an octagonal shape, and the second region REG2 may have a quadrangular shape. However, the exemplary embodiment is not limited thereto, and the shapes of the first region REG1 and the second region REG2 may be variously modified in a state in which the area of the first region REG1 is greater than that of the second region REG2.

Figure 3:
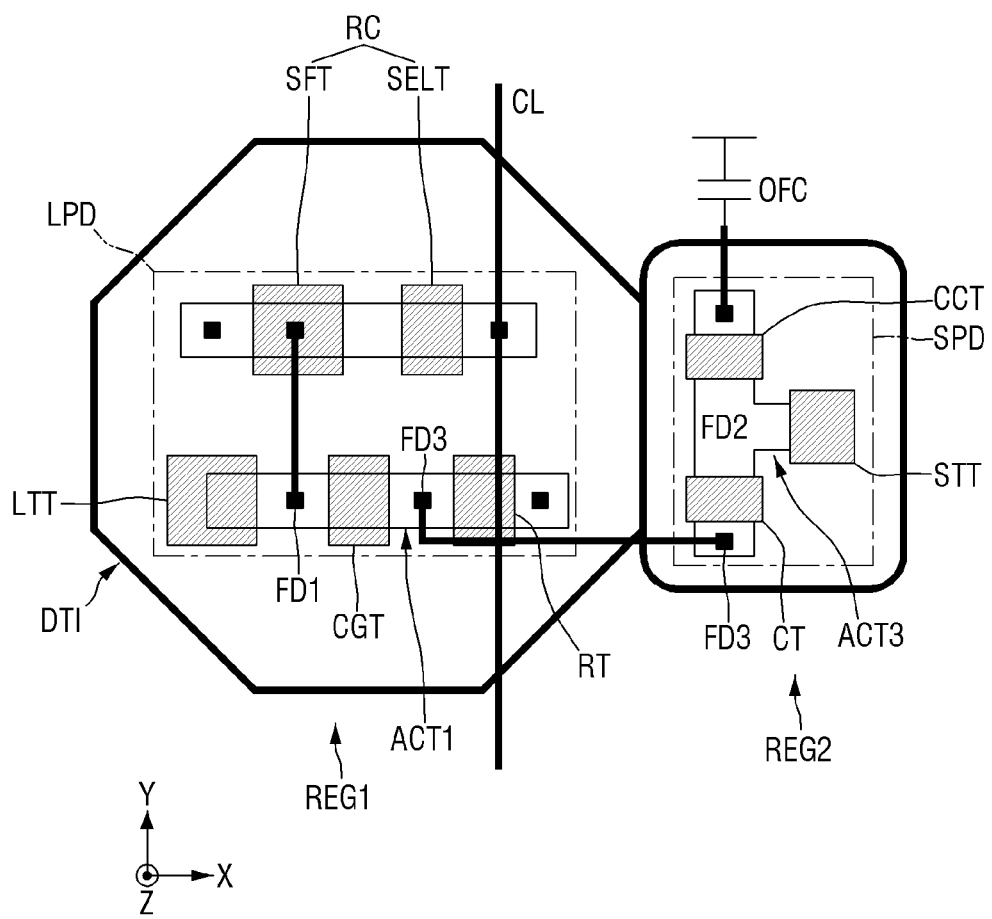
FIG. 3 is a layout illustrating an arrangement of components of the unit pixel of FIG. 1, according to some exemplary embodiments.

FIG. 3 is a layout in which the components included in the unit pixel circuit of FIG. 1 are disposed in the first and second regions REG1 and REG2 of the unit pixel of FIG. 2, according to some exemplary embodiments.

Referring to FIG. 3, the first region REG1 and the second region REG2 may be positioned to be adjacent to each other. The first region REG1 may have the first photodiode LPD, the first transfer transistor LTT, the conversion gain transistor CGT, the reset transistor RT, and the read circuit RC of the unit pixel UP disposed therein, and may include portions of the first node FD1 and the third node FD3. The first photodiode LPD may be formed to overlap active regions (e.g., a first active region ACT1 and a second active region ACT2) below in a vertical direction Z of the first and second active regions ACT1 and ACT2 where transistors are formed. One node of the select transistor SELT disposed in the first region REG1 may be connected to the column line CL.

The second region REG2 may have the second photodiode SPD, the second transfer transistor STT, and the connection transistor CT of the unit pixel UP disposed therein, and may include other partial regions of the second node FD2 and the third node FD3. The second photodiode SPD may be formed to overlap a third active region ACT3 below in the vertical direction Z of the third active region ACT3 where transistors are formed. One node of the capacitor connection transistor CCT of the second region REG2 may be connected to the overflow capacitor OFC. The overflow capacitor OFC may be disposed in the form of a metal insulator metal (MIM) on the third active region ACT3 in the vertical direction Z of the unit pixel. The third node FD3 region of the first region REG1 and the third node FD3 region of the second region REG2 may be connected by a conductive line.

The first region REG1 and the second region REG2 may be disposed such that at least one surface of the first region REG1 and at least one surface of the second region REG2 are adjacent to each other. Alternatively or additionally, the first region REG1 and the second region REG2 may be separated from each other by deep trench isolation DTI to possibly prevent electrical isolation and optical crosstalk between the first photodiode LPD and the second photodiode SPD.

When the size of the unit pixel decreases according to a high resolution of an image sensor, the transistors other than the second photodiode SPD and the second transfer transistor STT disposed in the second region REG2 may also be disposed in the first region REG1.

Figure 4A:
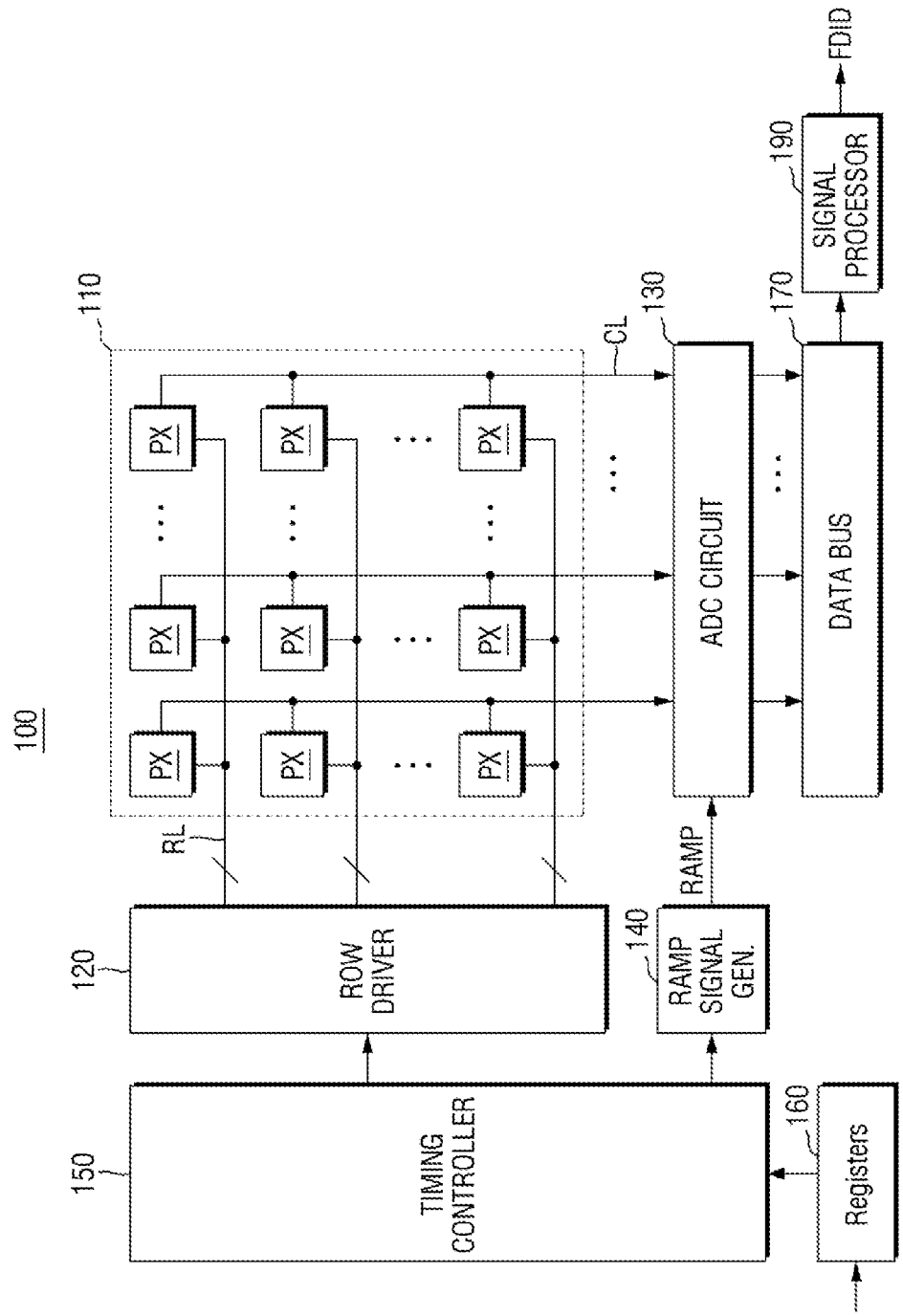
FIG. 4A is a block diagram of an image sensing device, according to some exemplary embodiments.

FIG. 4A is a block diagram of an image sensing device, according to some exemplary embodiments.

Referring to FIG. 4A, an image sensing device 100 may include a pixel array 110, a row driver 120, an analog-to-digital converter (ADC) block 130, a ramp signal generator 140, a timing controller 150, a mode setting register 160, a data bus 170, and a signal processor 190.

The image sensing device 100 may include a first semiconductor substrate, including the pixel array 110, and a second semiconductor substrate, including other blocks (e.g., elements 120 to 190) other than the pixel array 110. In an exemplary embodiment, the first semiconductor substrate and the second semiconductor substrate may be stacked on top of each other and/or may transmit signals to each other using through silicon vias (TSVs) and/or other connection means penetrating through the first semiconductor substrate. As an optional or additional exemplary embodiment, the image sensing device 100 may also include three semiconductor substrates. When the pixel array 110 includes two semiconductor chips, only the first photodiode LPD, the second photodiode SPD, and the transfer transistors LTT and STT connected to the first photodiode LPD and the second photodiode SPD in the pixel circuit of FIG. 1 may be formed in an upper chip, and other transistors and the overflow capacitor OFC may be formed in a lower chip.

The pixel array 110 may include a plurality of row lines RL, a plurality of column lines CL, and a plurality of unit pixels PX connected to the plurality of row lines RL and the plurality of column lines CL and arranged in rows and columns. Each pixel of the plurality of unit pixels PX may include and/or may be substantially the same as the unit pixel UP of FIG. 1.

In an embodiment, a micro lens and/or a color filter for condensing light may be disposed on each of the upper portions of the first region REG1 and the second region REG2 of the unit pixel. The color filters corresponding to one unit pixel may have the same color. The pixel array 110 may include a red unit pixel for converting light in a red spectrum region into an electrical signal, a green unit pixel for converting light in a green spectrum region into an electrical signal, and a blue unit pixel for converting light in a blue spectrum region into an electrical signal. The color filters may be replaced with color filters including, but not limited to, cyan, yellow, green, and magenta instead of the red, green and blue colors. That is, the present disclosure is not limited in this regard.

The mode setting register 160 is a register in which a user and/or an application processor AP (not shown) may set operation mode information of the image sensing device 100 through an interface connected to the image sensing device 100. The operation mode information may be changed by the user and/or the application processor AP on a frame unit, which may be a unit in which the image sensing device 100 outputs data to the application processor AP. A method of changing operation mode information is described with reference to FIGS. 15 and 16.

Figure 6:
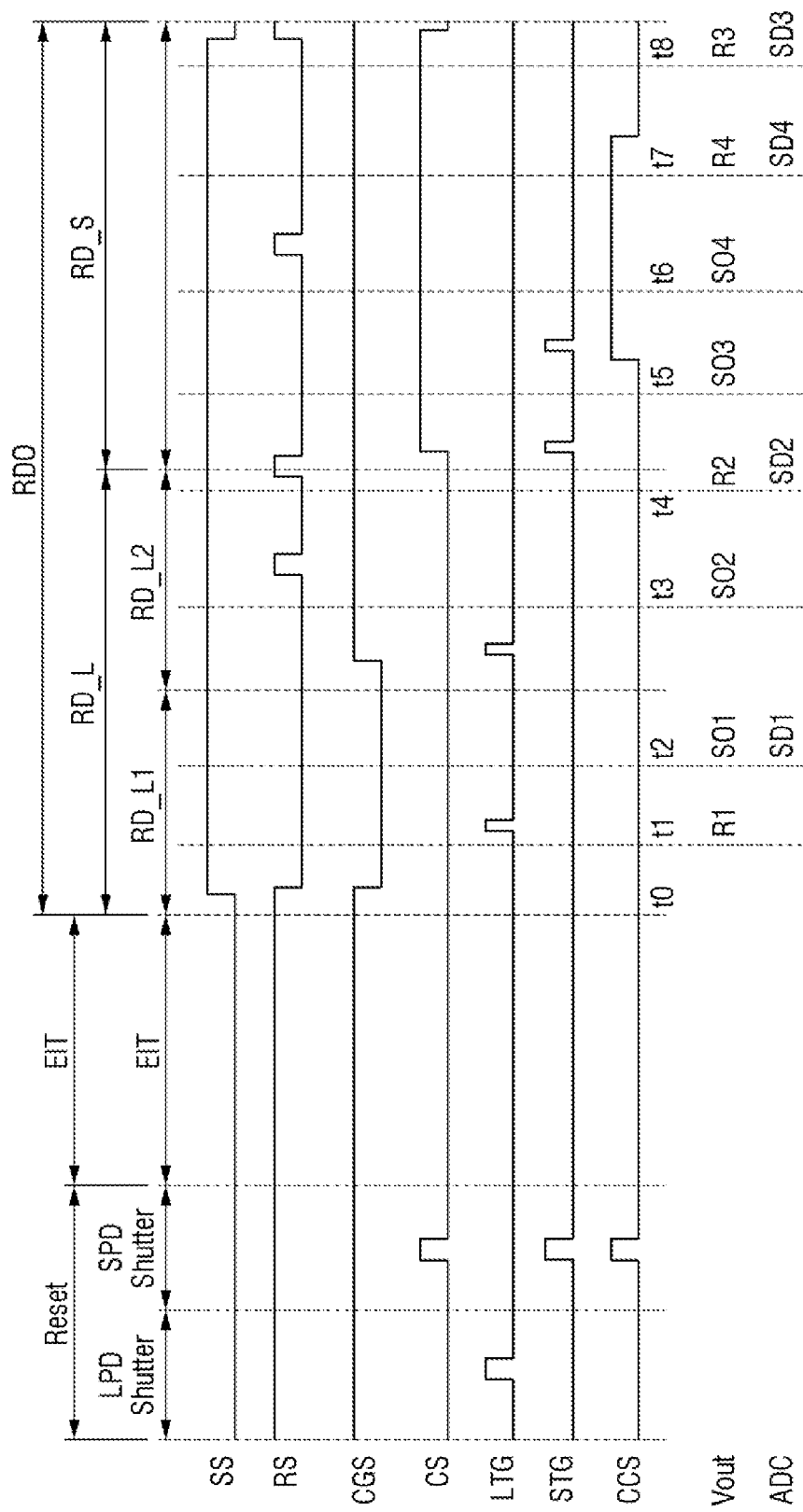
FIG. 6 is a timing diagram of a first operation mode of an image sensing device, according to some exemplary embodiments.

The timing controller 150 may generally control an image sensing operation of the image sensing device 100, according to the operation mode information set in the mode setting register 160. For example, the timing controller 150 may change a read operation order of pixels included in the pixel array 110 in response to the operation mode information set in the mode setting register 160. In a first operation mode, the timing controller 150 may control the row driver 120 so that an output signal (e.g., Vout of FIG. 6) of the pixel array 110 may sequentially include a first reset signal (e.g., R1 of FIG. 6) obtained by relating the charges generated by the first photodiode LPD to the first conversion gain, a first sub-output signal (e.g., SO1 of FIG. 6) obtained by converting the charges generated by the first photodiode LPD with the first conversion gain, a second sub-output signal (e.g., SO2 of FIG. 6) obtained by converting the charges generated by the first photodiode LPD with the second conversion gain, a second reset signal (e.g., R2 of FIG. 6), a third sub-output signal (e.g., SO3 of FIG. 6) obtained by converting the charges generated by the second photodiode SPD with the third conversion gain, a fourth sub-output signal (e.g., SO4 of FIG. 6) obtained by converting the charges stored in the overflow capacitor OFC with the fourth conversion gain, a fourth reset signal (e.g., R4 of FIG. 6) corresponding to the fourth sub-output signal, and a third reset signal (e.g., R3 of FIG. 6) corresponding to the third sub-output signal. That is, in the first operation mode, the output signal output from the pixel array 110 through the column lines may sequentially include, for example, signals output in the order of R1, SO1, SO2, R2, SO3, SO4, R4, and R3, as shown in FIG. 6.

Figure 10:
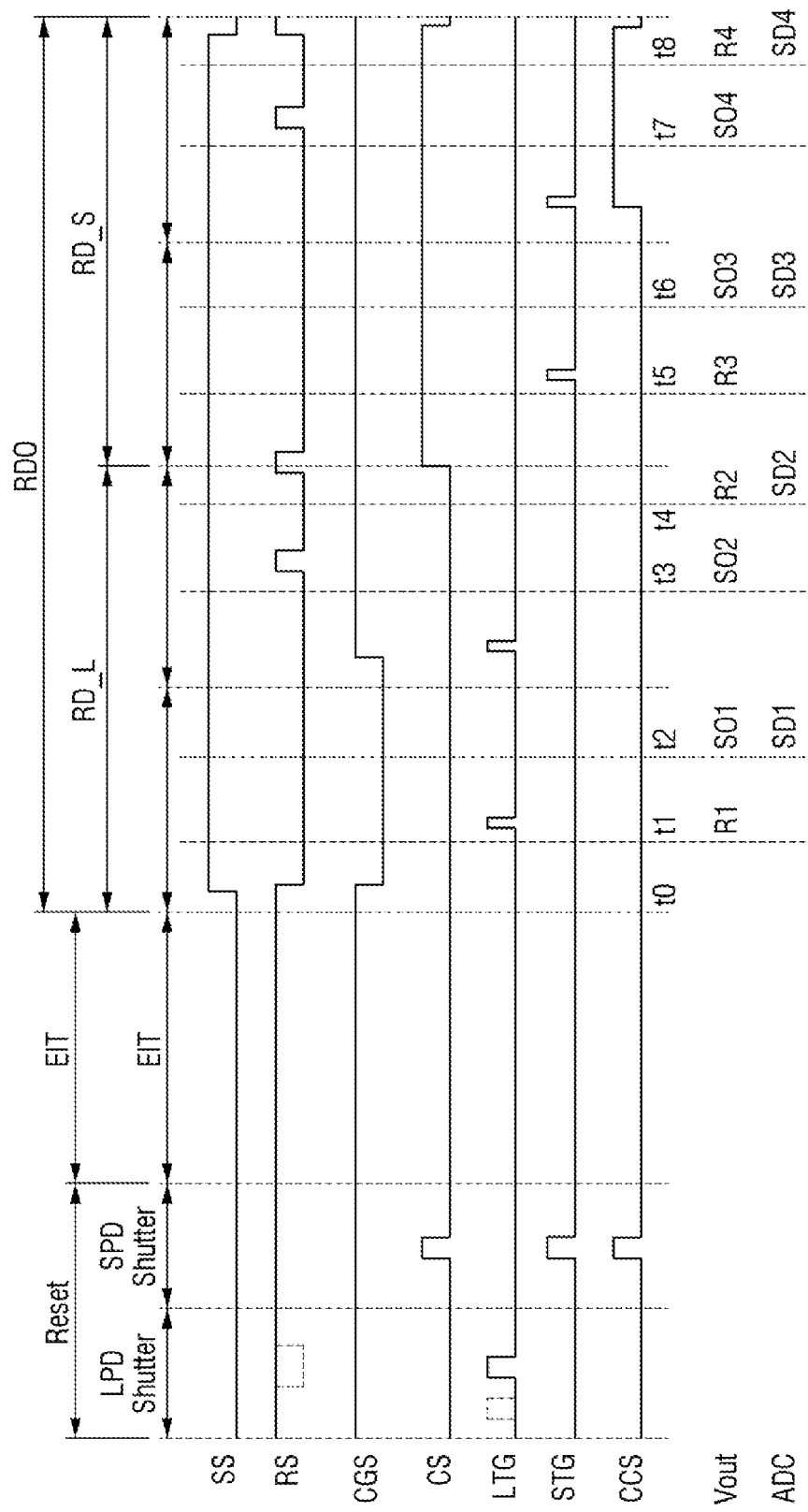
FIG. 10 is a timing diagram of a second operation mode of an image sensing device, according to some exemplary embodiments.

In a second operation mode, the timing controller 150 may control the row driver 120 so that an output signal of the pixel array 110 may sequentially include a first reset signal (e.g., R1 of FIG. 10) obtained by relating the charges generated by the first photodiode LPD to the first conversion gain, a first sub-output signal (e.g., SO1 of FIG. 10) obtained by converting the charges generated by the first photodiode LPD with the first conversion gain, a second sub-output signal (e.g., SO2 of FIG. 10) and a second reset signal (e.g., R2 of FIG. 10) obtained by converting the charges generated by the first photodiode LPD with the second conversion gain, a third reset signal (e.g., R3 of FIG. 10) obtained by relating the charges generated by the first photodiode LPD to the third conversion gain, a third sub-output signal (e.g., SO3 of FIG. 10) obtained by converting the charges generated by the second photodiode SPD with the third conversion gain, a fourth sub-output signal (e.g., SO4 of FIG. 10) obtained by converting the charges stored in the overflow capacitor OFC with the fourth conversion gain, and a fourth reset signal (e.g., R4 of FIG. 10) corresponding to the fourth sub-output signal. That is, in the second operation mode, the output signal output from the pixel array 110 through the column lines may sequentially include, for example, signals output in the order of R1, SO1, SO2, R2, R3, SO3, SO4, and R4, as shown in FIG. 10.

In an embodiment, the row driver 120 may drive the pixel array 110 in units of rows. For example, the row driver 120 may decode a row control signal (e.g., an address signal) received from the timing controller 150, and/or may select at least one row line from among row lines constituting the pixel array 110 in response to the decoded row control signal.

The row driver 120 may transmit control signals for generating the output signal (e.g., Vout of FIG. 6) from the pixels connected to the selected row to the pixel array 110. That is, in some exemplary embodiments, the timing controller 150 and/or the row driver 120 may serve as a driver. The control signals may include first and second transfer control signals LTG and STG, a reset control signal RS, a connection control signal CS, a conversion gain control signal CGS, and a capacitor connection control signal CCS. The row driver 120 may provide each control signal to the pixel array 110 according to a reset section, an exposure section, and a read-out section under the control of the timing controller 150. A detailed description thereof is provided with reference to FIG. 6.

The ramp signal generator 140 may generate a ramp signal RAMP that may increase and/or decrease with a predetermined slope. For example, the ramp signal generator 140 may provide the ramp signal RAMP to the ADC block 130.

The ADC block 130 may receive a pixel output signal from the pixels PX of a row selected by the row driver 120 from among the plurality of pixels PX through the column line CL. In this case, the pixel output signal may include the first sub-output signal SO1 and the second sub-output signal SO2 corresponding to the generated charges of the first photodiode LPD and the third and fourth sub-output signals SO3 and SO4 corresponding to the generated charges of the second photodiode SPD. Alternatively or additionally, the pixel output signal may include the first to fourth reset signals R1 to R4 corresponding to each of the sub-output signals.

Figure 8:
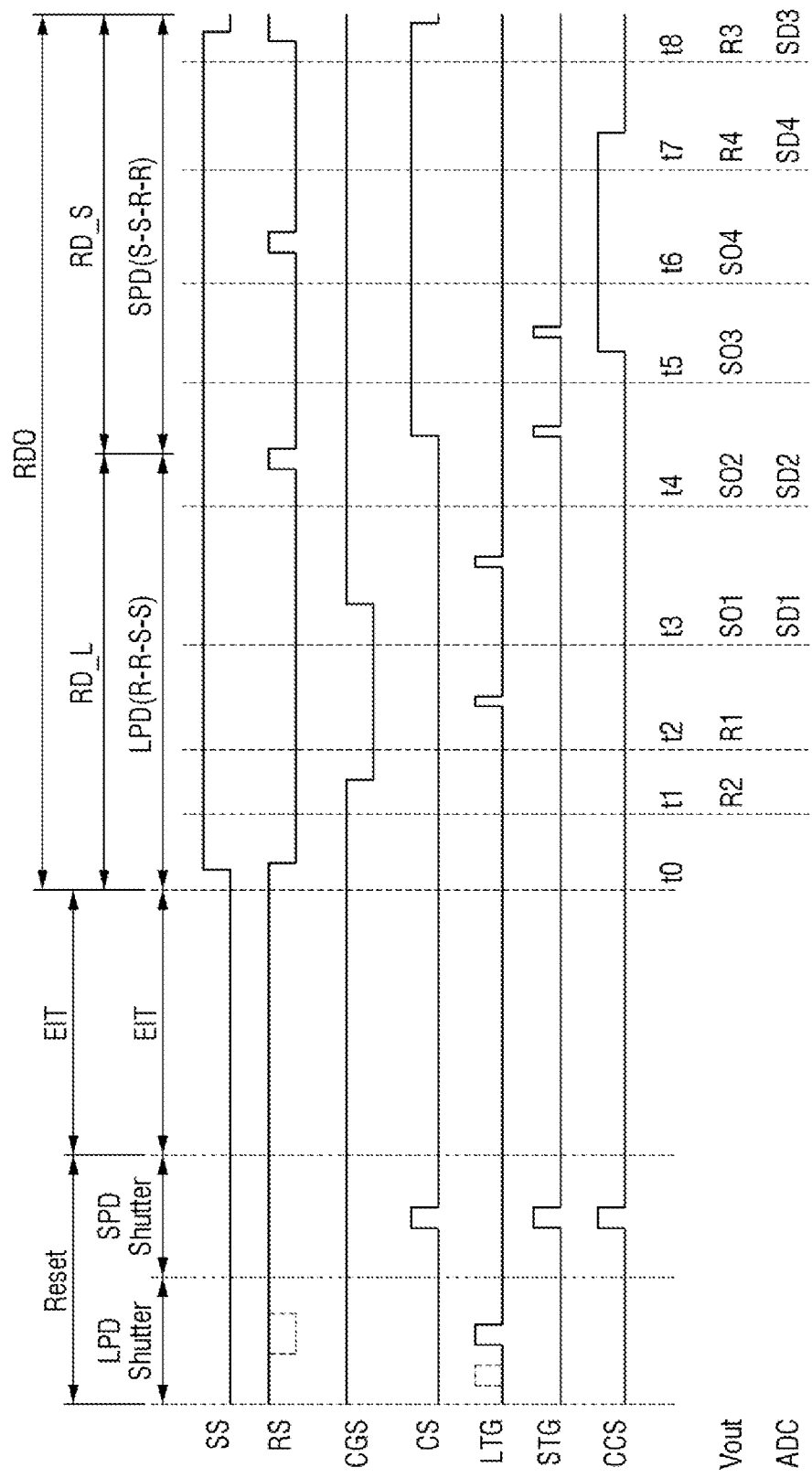
FIG. 8 is an operation timing diagram according to a modification of the first operation mode of the imaging sensing device, according to some exemplary embodiments.

In an embodiment, the ADC block 130 may include a plurality of ADC circuits corresponding to the plurality of column lines CL, and each of the plurality of ADC circuits may include a comparator that compares each sub-output signal received through a corresponding column line CL and a reset signal corresponding thereto with the ramp signal RAMP, and a counter and latch that converts a comparison signal based on the comparison result into a digital value, and generate first to fourth sub-digital signals (e.g., SD1 to SD4 of FIG. 6, 8, or 10).

Correlated double sampling (CDS) may refer to a technique capable of outputting a difference between a reset level and a signal level by doubly sampling the reset level and the signal level of a floating diffusion region. A method of first reading out the reset level and then reading out the signal level may be referred to as a complete CDS method. Alternatively or additionally, a method of first reading out the signal level and then reading out the reset level may be referred to as an incomplete CDS method.

In the first operation mode, the ADC block 130 may generate the first sub-digital signal SD1 by performing a first complete CDS on R1 and SO1 among the output signals output in the order of R1, SO1, SO2, R2, SO3, SO4, R4, and R3, from the pixel array 110 in the first operation mode, generate the second sub-digital signal SD2 by performing a first incomplete CDS on SO2 and R2, generate the fourth sub-digital signal SD4 by performing a second incomplete CDS on SO4 and R4, and generate the third sub-digital signal by performing a third incomplete CDS on SO3 and R3. That is, in the first operation mode, corresponding sub-digital signals may be generated through two incomplete CDS operations on the charges generated by the second photodiode SPD.

In the second operation mode, the ADC block 130 may generate the first sub-digital signal SD1 by performing the complete CDS on R1 and SO1 among the output signals output in the order of R1, SO1, SO2, R2, R3, SO3, SO4, and R4 from the pixel array 110, generate the second sub-digital signal SD2 by performing the incomplete CDS on SO2 and R2, generate third sub-digital signal SD3 by performing the complete CDS on R3 and SO3, and generate the fourth sub-digital signal SD4 by performing the incomplete CDS on SO4 and R4. That is, unlike the first operation mode, in the second operation mode, corresponding sub-digital signals may be generated through one complete CDS and one incomplete CDS on the charges generated by the second photodiode SPD. Thereby, the method of performing CDS when generating the sub-digital signals SD3 and SD4 related to the second photodiode SPD may vary depending on the operation mode set in the mode setting register 160 of the image sensing device 100.

The data bus 170 may receive the first to fourth sub-digital signals SD1 to SD4 from the ADC block 130, temporarily store the first to fourth sub-digital signals SD1 to SD4, align the first to fourth sub-digital signals SD1 to SD4, and then output the first to fourth sub-digital signals SD1 to SD4 to the signal processor 190. The data bus 170 may include a memory and a memory controller. The first to fourth sub-digital signals SD1 to SD4 stored in the memory may be output to the signal processor 190 under the control of the memory controller.

The signal processor 190 may merge the received first sub-digital signal to fourth sub-digital signal to generate final digital image data FDID. As the pixel array 110 performs a read operation in a high conversion gain HCG mode of the first photodiode LPD, a low conversion gain LCG mode of the first photodiode (LPD), a high conversion gain HCG mode of the second photodiode (SPD), and a low conversion gain LCG mode of the second photodiode SPD in one frame section, the signal processor 190 may receive the first to fourth sub-digital signals SD1 to SD4 corresponding to the modes from the data bus 170, and generate digital image data having a high dynamic range by merging the received first to fourth sub-digital signals SD1 to SD4. The signal processor 190 may generate a final digital image data FDID by further performing at least one of noise reduction processing, gain adjustment, waveform shaping processing, interpolation processing, white balance processing, gamma processing, edge enhancement processing, binning, and the like, on the merged digital image data signal. In an optional or additional exemplary embodiment, the signal processor 190 may be provided in an external processor of the image sensing device 100.

Figure 4B:
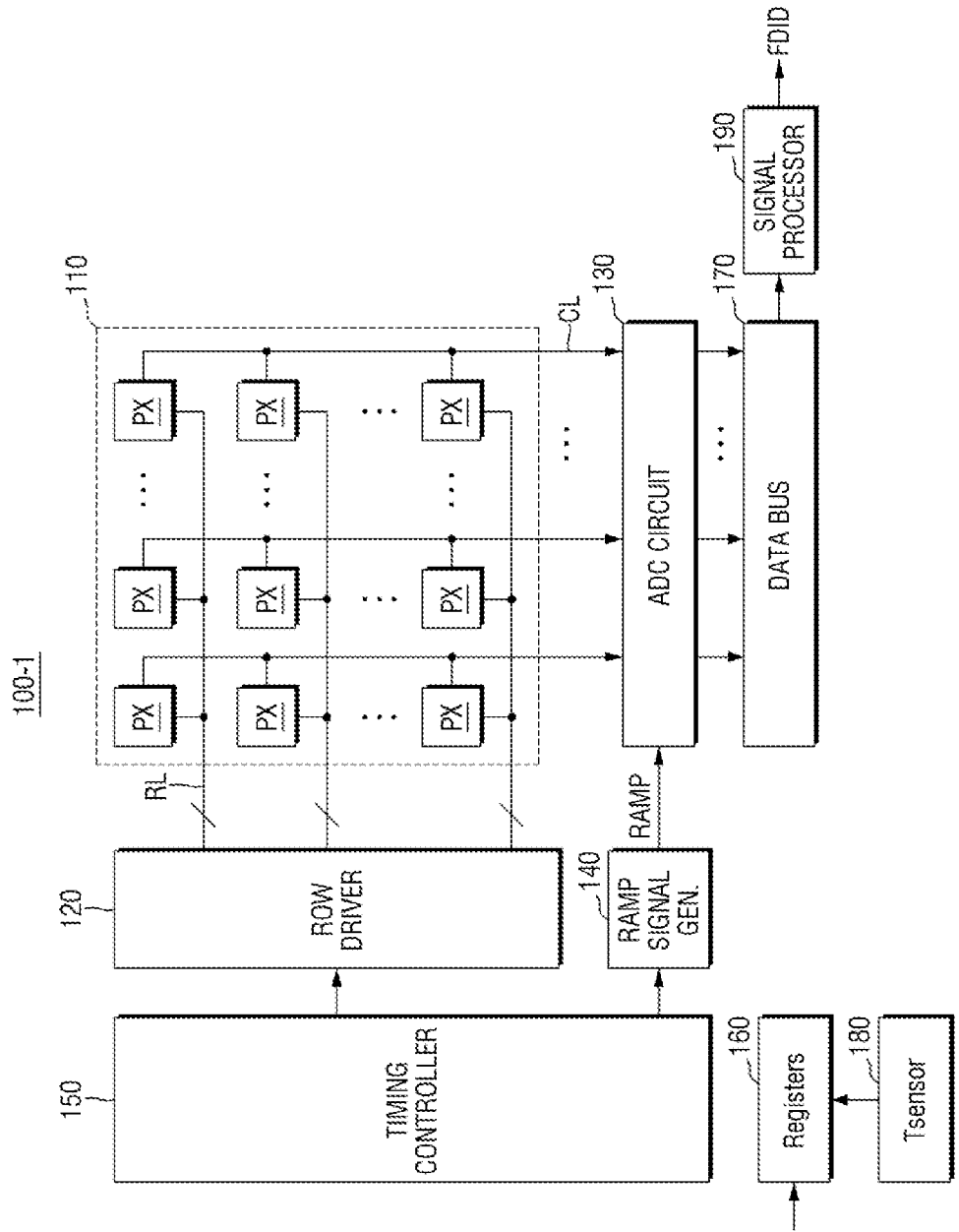
FIG. 4B is a block diagram of an image sensing device, according to some exemplary embodiments.

FIG. 4B is a block diagram of an image sensing device 100-1, according to some exemplary embodiments.

Referring to FIG. 4B, an image sensing device 100-1 may include and/or may be similar in many respects to the image sensing device 100 of FIG. 4A, and may include additional features not mentioned above. For example, as shown in FIG. 4B, the image sensing device 100-1 may include a temperature sensor 180. The image sensing device 100-1 may set the mode setting register 160 through an external interface. Alternatively or additionally, the image sensing device 100-1 may change a register value according to temperature information of the image sensing device 100-1 obtained through the temperature sensor 180. For example, the image sensing device 100-1 may operate in the second operation mode and may change to operate in the first operation mode when the temperature reaches a preset temperature.

Figure 4C:
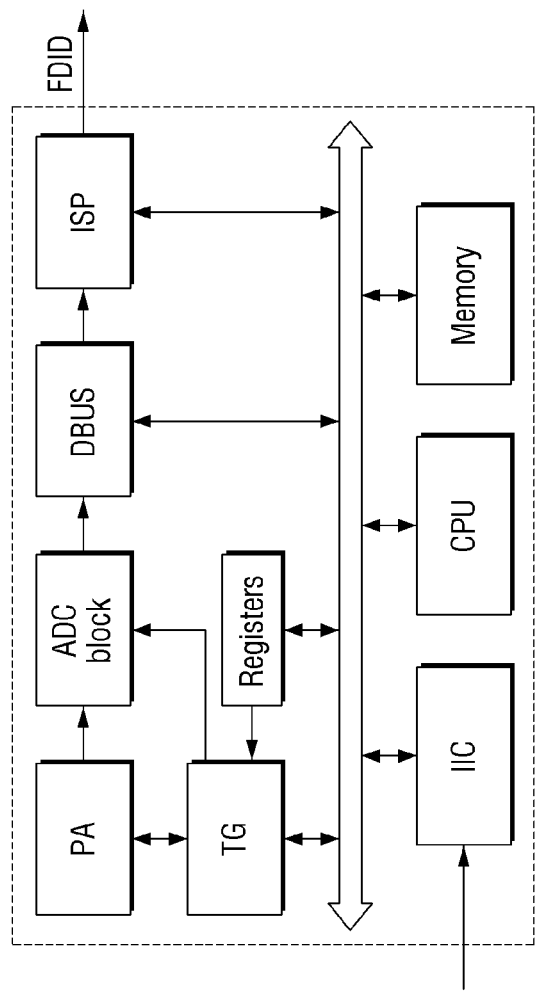
FIG. 4C is a block diagram of an image sensing device, according to some exemplary embodiments.

FIG. 4C is a block diagram of an image sensing device 100-2 according to some exemplary embodiments.

Referring to FIG. 4C, the image sensing device 100-2 of FIG. 4C may include and/or may be similar in many respects to at least one of the image sensing device 100 of FIG. 4A and the image sensing device 100-1 of FIG. 4B, and may include additional features not mentioned above. For example, as shown in FIG. 4C, the image sensing device 100-2 may include a central processing unit (CPU) and a memory. The image sensing device 100-2 may include the CPU. In an embodiment, the CPU may drive firmware (FW)

stored in an internal memory to control other internal components such as, but not limited to, a timing controller TG.

The application processor CPU may write an address corresponding to the FW register assigned to the operation mode and a change value thereto from among FW registers through an external interface IIC, such as, but not limited to, a camera control interface (CCI) and/or an inter-integrated circuit (I2C) interface. The CPU may read the changed values of the FW registers from the memory before each frame starts and change a setting value of the mode setting register. That is, the image sensing device 100-2 may change the operation mode through the FW register. In an optional or additional embodiment, the temperature sensor 180 of FIG. 4B may be further included in the image sensing device 100-2.

Figure 5:
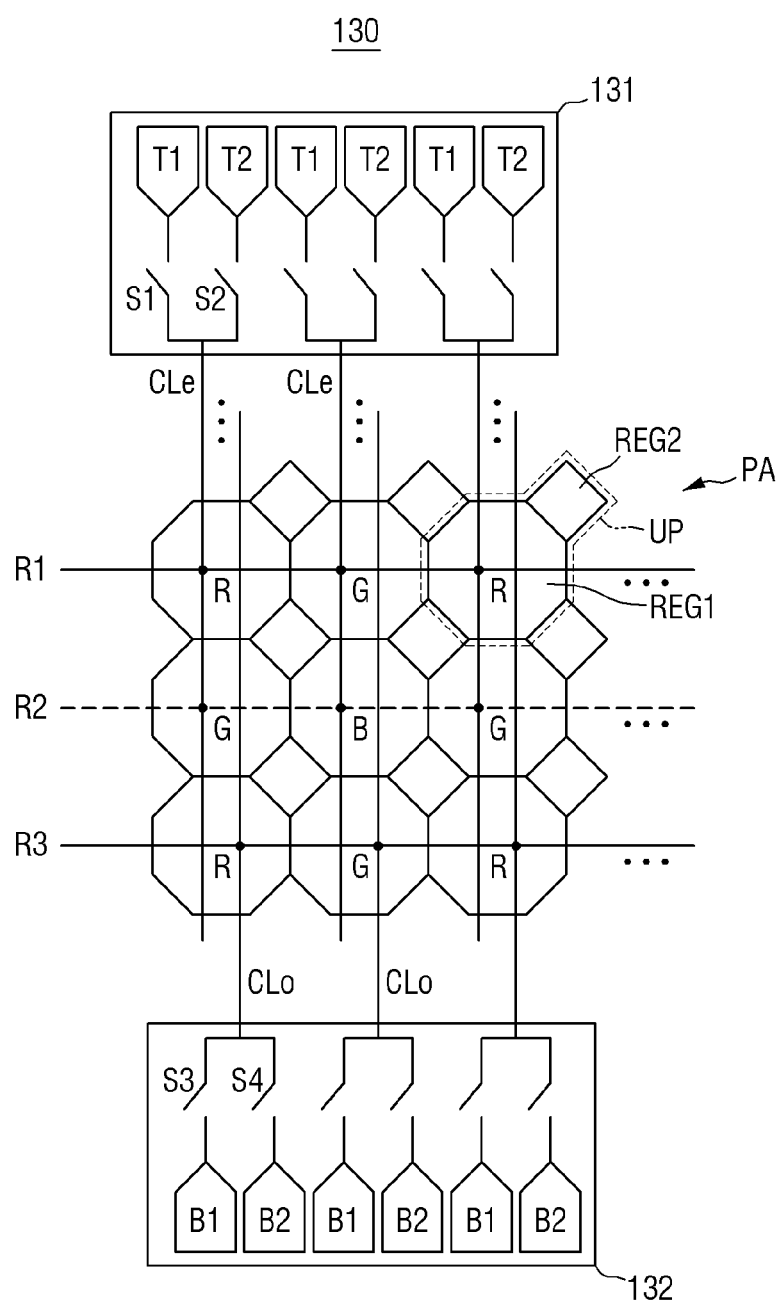
FIG. 5 is a configuration diagram illustrating a connection between a pixel array and an ADC block of the image sensing devices of FIGS. 4A to 4C, according to some exemplary embodiments.

FIG. 5 is a configuration diagram illustrating a connection between a pixel array and an ADC block of the image sensing devices of FIGS. 4A to 4C, according to some exemplary embodiments.

Referring to FIG. 5, the ADC block 130 may include a first ADC block 131 and a second ADC block 132. Alternatively or additionally, the ADC block 130 may be connected to the pixel array PA through each of the column lines. For convenience of explanation, FIG. 5 illustrates a pixel array having three columns and three rows. However, the present disclosure is not limited in this regard. For example, the pixel array may have more (e.g., more than three (3) rows and/or columns without deviating from the scope of the present disclosure. Alternatively or additionally, in order to shorten a data output time of the image sensor device, each column may include odd and even-numbered columns CLe and CLo to activate and/or read the pixels connected to the two rows R1 and R3 at the same time. However, the exemplary embodiment may also be applied to a structure in which pixels connected to one row or three or more rows may be simultaneously read.

The ADC block 130 may include a first ADC block 131 that may be connected to the even-numbered column lines Cle among the column lines, and a second ADC block 132 that may be connected to the odd-numbered column lines CLo among the column lines. The first ADC block 131 may include a first ADC T1 and a second ADC T2 connected to each even-numbered column line through first and second switches S1 and S2, respectively. The second ADC block 132 may include a third ADC B1 and a fourth ADC B2 connected to each odd-numbered column line through third and fourth switches S3 and S4, respectively. The first to fourth switches S1 to S4 may be controlled by the timing controller (e.g., timing controller 150 of FIG. 4A), according to the operation mode.

FIG. 6 is a timing diagram of a first operation mode of an image sensing device, according to some exemplary embodiments.

In the timing diagram of FIG. 6, waveforms of a selection control signal SS, a reset control signal RS, a conversion gain control signal CGS, a connection control signal CS, a first transfer control signal LTG, a second transfer control signal STG, and a capacitor connection control signal CCS as control signals applied to gates of transistors of pixels of the pixel array 110 are illustrated in order. Such control signals may be generated in the form of pulses in the row driver (e.g., row driver 120 of FIG. 4A) under the control of the timing controller 150. Each of the pulse waveforms may toggle between a high level voltage and a low level voltage. The high level voltage may turn the transistor on, and the low level voltage may turn the transistor off. However, according to various exemplary embodiments, when some of the transistors constituting the pixel of FIG. 1 are configured as p-channel metal-oxide semiconductor (PMOS), the pulse waveform may be driven in a manner opposite to that of FIG. 6. That is, a high level voltage may turn the transistor off, and the low level voltage may turn the transistor on.

The time from a start time t0 to an end time t8, as shown in FIG. 6, may be a horizontal time section from a reset operation of the photodiodes of the pixels connected to the selected rows to outputting the output signal, and may represent a 1H operation section. When the time of the 1H operation section is multiplied by the number of rows constituting the pixel array 110, the minimum time for generating an image data signal of one frame may be obtained.

An operation according to the first operation mode is described below with reference to FIGS. 1 and 6.

An operation section of the first operation mode of the pixel may include a reset section Reset, a single exposure section EIT, and a read-out section RDO. The reset section Reset may include a first photodiode LPD shutter section LPD Shutter that may reset the first node FD1, the third node FD3, and the first photodiode LPD together by toggling the LTG in a state in which the first node FD1 and the third node FD3 are connected by maintaining the RS and the CGS at a high level. Alternatively or additionally, the reset section Reset may include a second photodiode SPD shutter section SPD Shutter that may reset the first node FD1, the second node FD2, the third node FD3, the overflow capacitor OFC, and the second photodiode SPD together by toggling the STG, the CS, and the CCS together (e.g., at substantially the same time).

In the exposure section EIT, the RS and the CGS may be maintained at a high level while all other signals may be maintained at a low level. As a result, the first node FD1 and the third node FD3 may maintain a reset state by the turned-on reset transistor RT and conversion gain transistor CGT. During the exposure section EIT, the first photodiode LPD and the second photodiode SPD may generate and accumulate charges according to the amount of received light. The exposure time EIT may have a time length (e.g., 11 ms or more) sufficient to minimize a flicker phenomenon caused by an LED. When the charges generated by the light received by the second photodiode SPD during the exposure time EIT are greater than a charge storage capacity of the second photodiode SPD, the charges may overflow to the second node FD2 even if the STG is at a low level. The capacitor connection transistor CCT having a lower threshold voltage than the connection transistor CT may be turned on by the overflowed charges, and the overflowed charges may be stored in the overflow capacitor OFC through the capacitor connection transistor CCT.

The read-out section RDO may sequentially include a first photodiode LPD read section RD_L and a second photodiode SPD read section RD_S. The first photodiode LPD read section RD_L may include a first operation section RD_L1 and/or a second operation section RD_L2. The first operation section RD_L1 may output the first reset signal R1 and the first sub-output signal SO1 by using the first conversion gain. Alternatively or additionally, the second operation section RD_L2 may output the second reset signal R2 and the second sub-output signal SO2 by using the second conversion gain. The second photodiode SPD read section RD_S may include sections that sequentially output the third sub-output signal SO3 using the third conversion gain, the fourth sub-output signal SO4 using the fourth conversion gain, the reset signal R4 corresponding to the fourth sub-output signal, and the third reset signal R3 corresponding to the third sub-output signal SO3. During the read-out section RDO, the selection control signal SS may maintain a high level.

The first operation section RD_L1 may include a first time t1 in which the first reset signal R1 may be output by the reset first node FD1 and/or a second time t2 in which the first sub-output signal SO1 may be output by reading a voltage of the first node FD1 using the first conversion gain after transferring the charges generated by the first photodiode LPD to the first node FD1 during the exposure time EIT. Before the first time t1, the selection control signal SS may be switched from a low level to a high level, and the RS and CGS signals may be switched from a high level to a low level. At the first time t1, the read circuit RC, including the source follower transistor SFT, may convert the voltage of the reset first node FD1 into the first reset signal R1 and may output the first reset signal R1 to the column line. Before the second time t2, the first transfer control signal LTG may be toggled, and accordingly, the first transfer transistor LTT may be turned on, and the charges accumulated in the first photodiode LPD during the exposure section EIT may be transferred to the first node FD1. At the second time t2, the read circuit RC. including the source follower transistor SFT. may convert the voltage of the first node FD1 converted with the first conversion gain into the first sub-output signal SO1 and may output the first sub-output signal SO1 to the column line. The ADC block 130 of any one of FIGS. 4A to 4C may receive R1 and SO1, may perform a complete correlated double sample CDS operation using the two signals, and/or may generate the first sub-digital signal SD1.

The second operation section RD_L2 may include a third time section t3 in which the charges transferred from the first photodiode LPD may be read with the second conversion gain and a fourth time section t4 in which a second reset and read may be performed. Between the second time t2 and the third time t3, CGS may be switched from a low level to a high level to turn on the conversion gain transistor CGT. As a result, the first node FD1 and the third node FD3 may be connected, and the charges transferred to the first node FD1 in the first operation section RD_L1 may be shared with the third node FD3. In the state in which the conversion gain transistor CGT is turned on, LTG may be toggled, and the charges accumulated in the first photodiode LPD after a first LTG toggling may be shared by the first node FD1 and the third node FD3 together with previously transferred charges. Since the exposure section EIT time may be significantly longer than the time between toggling of the LTG signals, the amount of charges generated in the first photodiode LPD between toggling of the LTG signals may be considerably smaller than the amount of charges generated in the first photodiode LPD during the exposure section EIT time.

At the third time t3, the read circuit RC, including the source follower transistor SFT, may convert the voltage of the first node FD1 converted with the second conversion gain by the sum of the capacitances of the first node FD1 and the third node FD3 into the second sub-output signal SO2 and may output the second sub-output signal SO2 to the column line. If or when the RS is toggled between the third time t3 and the fourth time t4 in the state in which the conversion gain transistor CGT is turned on, the reset transistor RT may be turned on, and accordingly, the charges transferred to the first node FD1 and the third node FD3 may be reset. The voltage of the first node FD1 reset at the fourth time t4 may be converted into the second reset signal R2 by the source follower transistor SFT and output to the column line. The ADC block 130 of any one of FIGS. 4A to 4C may receive SO2 and R2, may perform an incomplete correlated double sample CDS operation using the two signals, and/or may generate the second sub-digital signal SD2.

The second photodiode SPD read section RD_S may include a fifth time section t5 in which the charges accumulated in the second photodiode SPD during the exposure time EIT may be read with the third conversion gain and a sixth time t6 in which the charges accumulated in the overflow capacitor OFC during the exposure time EIT may be read with the fourth coverage gain. Before the fifth time t5, the STG may be toggled in a state in which the connection transistor CT is turned on by switching the CS to a high level. Accordingly, the charges overflowing the second node FD2 and the charges accumulated in the second photodiode SPD may be shared by the second node FD2, the third node FD3, and the first node FD1. At the fifth time t5, the read circuit RC, including the source follower transistor SFT, may convert the voltage of the first node FD1 converted with the third conversion gain by the sum of the capacitances of the second node FD2, the third node FD3, and the first node FD1 into the third sub-output signal SO3 and may output the third sub-output signal SO3 to the column line.

Before the sixth time t6, the capacitor connection transistor CCT may be turned on by converting the CCS to a high level, and the charges accumulated in the OFC may be shared by the second node FD2, the third node FD3, and the first node FD1. In this case, the STG may be toggled and the charges accumulated in the second photodiode SPD after a first STG toggling may be transferred to the second node FD2. At the sixth time t6, the read circuit RC, including the SFT, may convert the voltage of the first node FD1 converted with the fourth conversion gain by the sum of the capacitances of the overflow capacitor OFC, the first node FD1, the second node FD2, and the third node FD3 into the fourth sub-output signal SO4 and may be output the fourth sub-output signal SO4 to the column line.

The second photodiode SPD read section RD_S may include a seventh time t7 in which a fourth reset and read may be performed after the overflow capacitor OFC, the first node FD1, the second node FD2, and the third node FD3 may be reset, and an eighth time t8 in which a third reset and read may be performed in a state in which the first node FD1, the second node FD2, and the third node FD3 except for the overflow capacitor OFC may be reset.

If or when the RS is toggled before the seventh time t7, the reset transistor RT may be turned on, and the charges of the first node FD1, the second node FD2, the third node FD3, and the overflow capacitor OFC may be reset by the conversion gain transistor CGT, the connection transistor CT, and the capacitor connection transistor CCT in the turned-on state. At the seventh time t7, the voltage of the first node FD1 may be converted into the fourth reset signal R4 by the source follower transistor SFT and output to the column line. Before the eighth time t8, the capacitor connection transistor CCT may be turned off by converting the CCS to a low level, and the overflow capacitor OFC may be separated from the third node FD3, the second node FD2, and the first node FD1. At the eighth time t8, the voltage of the first node FD1 may be converted into the third reset signal R3 by the source follower transistor SFT and output to the column line. The ADC block 130 of any one of FIGS. 4A to 4C may sequentially receive the SO3, the SO4, the R4, and the R3 during the second photodiode SPD read section RD_S, may generate the fourth sub-digital signal SD4 by performing the incomplete CDS operation using the SO4 and the R4, and/or may generate the third sub-digital signal SD3 by performing the incomplete CDS operation using the SO3 and the R3.

Figure 7:
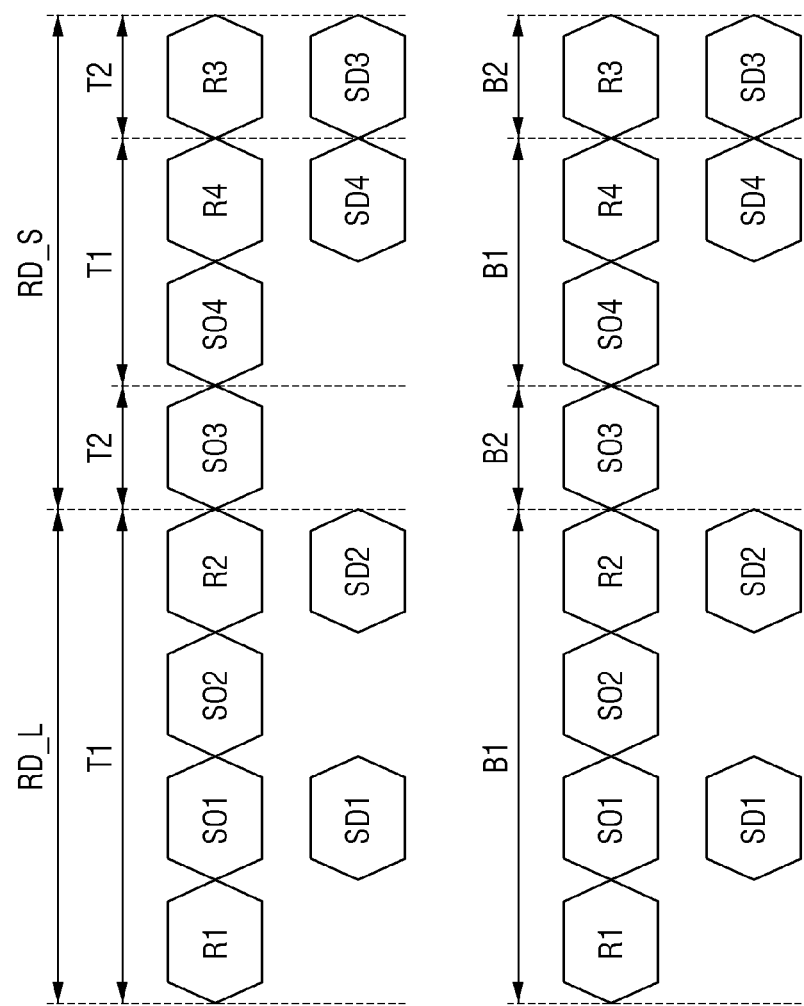
FIG. 7 is a diagram illustrating an enabled analog-to-digital converter (ADC) circuit of an ADC block corresponding to the timing diagram of FIG. 6, according to some exemplary embodiments.

FIG. 7 illustrates an operation sequence of ADC circuits of sub-ADC blocks of the ADC block 130 of FIG. 5, according to the operation timing of FIG. 6, and according to some exemplary embodiments. As shown in FIG. 7, two columns R1 and R3 may be selected together from the pixel array of FIG. 5, and in the read-out section RDO of the operation timing of FIG. 6, an operation sequence of the ADC circuits T1, T2, B1, and B2 constituting the ADC blocks 131 and 132 of the ADC block 130. The operation sequence of the ADC circuits T1, T2, B1, and B2 is described with reference to FIGS. 7 to 9 together.

In the first photodiode LPD read section RD_L, only one T1 and B1 of the ADC circuits T1, T2, B1, and B2 may be connected to each column line included in the first ADC block 131 and the second ADC block 132 of the ADC block 130 may be enabled. The enabled ADC circuits T1 and B1 may generate the SD1 by performing the complete CDS on the R1 and the SO1 sequentially transferred from each column line, and may generate the SD2 through the incomplete CDS operation using the SO2 and the R2.

In the second photodiode SPD read section RD_S, the ADC circuits T1, T2, B1, and B2 may be connected to each column line included in the first ADC block 131 and the second ADC block 132 of the ADC block 130 may be enabled and operated. Any one T2 and B2 of the ADCs T1, T2, B1, and B2 enabled in each ADC block may receive the SO3, may compare the SO3 with a ramp signal, and/or may latch a comparison value. Thereafter, the other one T1 and B1 may sequentially receive the SO4 and the R4 and/or may generate the fourth sub-digital signal SD4 through the incomplete CDS operation. Thereafter, the ADC T2 and B2 latching the SO3 comparison value may receive the R3 and generate the fourth sub-digital signal SD4 using the latched SO3 comparison value and R3.

FIG. 8 is an operation timing diagram according to a modification of the first operation mode of the imaging sensing device, according to some exemplary embodiments.

The first photodiode LPD read section RD_L of the timing diagram of FIG. 8 may be similar in many respects to the read section RD_L described above with reference to FIG. 6, except that R2, R1, SO1, and SO2 may be output in order unlike the first photodiode LPD read section RD_L of FIG. 6. That is, the first photodiode LPD read section RD_L of the timing diagram of FIG. 8 may be the same as that described in FIG. 6 except that the control signals may be controlled so that the second reset signal R2 of the second conversion gain, the first reset signal R1 of the first conversion gain, the first sub-output signal SO1 of the first conversion gain, and the second sub-output signal SO2 of the second conversion gain may be sequentially output. The ADC block 130 may sequentially receive the R2, the R1, the SO1, and the SO2 during the first photodiode LPD read section RD_L, may generate the first sub-digital signal SD1 by performing the complete CDS operation using the R1 and the SO1, and/or may generate the second sub-digital signal SD2 by performing the complete CDS operation using the R2 and the SO2.

Figure 9:
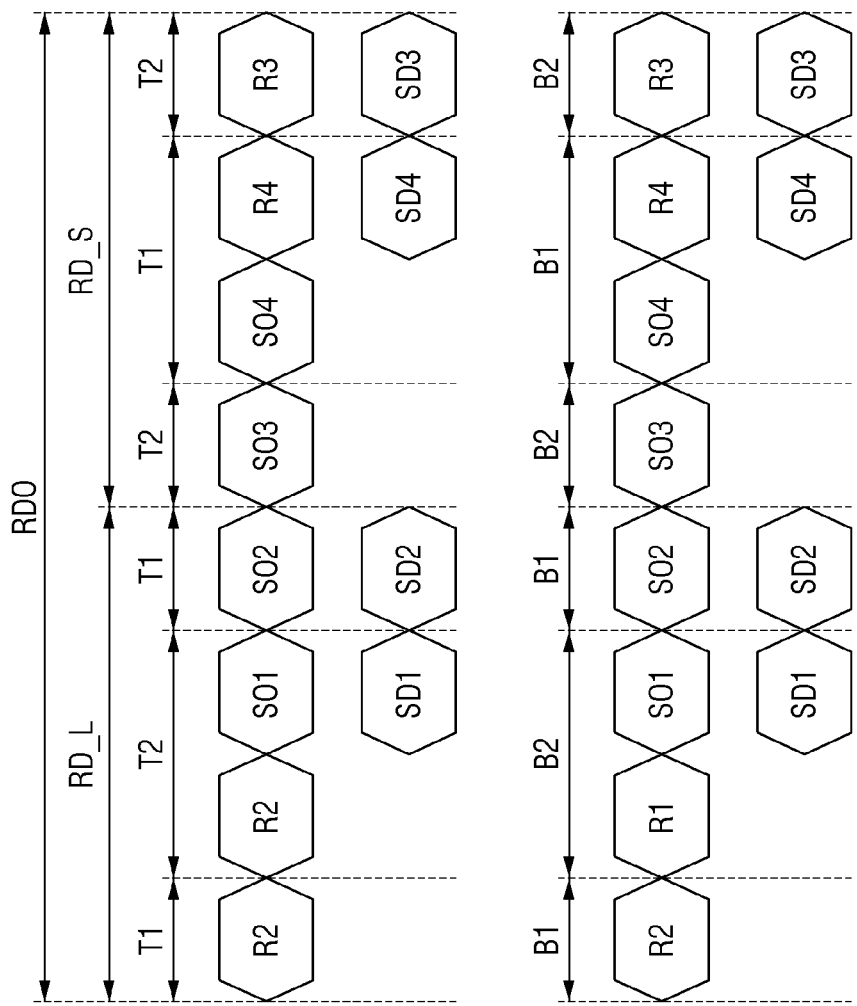
FIG. 9 is a diagram illustrating an enabled ADC circuit of an ADC block corresponding to the timing diagram of FIG. 8, according to some exemplary embodiments.

FIG. 9 illustrates an operation sequence of ADC circuits of the ADC block 130 according to the timing diagram of FIG. 8, according to some exemplary embodiments.

Unlike FIG. 7, in FIG. 9, in the first photodiode LPD read section RD_L and the second photodiode SPD read section RD_S, the ADC circuits T1, T2, B1, and B2 connected to each column line included in the first ADC block 131 and the second ADC block 132 of the ADC block 130 may be all enabled and operated. In the first photodiode LPD read section RD_L, the T1 and B1 may respectively compare the R2 transferred to the corresponding column line with the ramp signal and latch the comparison value. The T2 and B2 may respectively receive the R1 and the SO1 transferred to the corresponding column line and may generate the first sub-digital signal SD1 by performing the complete CDS. Thereafter, the T1 and B1 may receive the SO2 and generate the second sub-digital signal SD2 by performing the complete CDS using the latched R2 comparison value and the SO2. Since the operation of the second photodiode SPD read section RD_S is substantially the same as that of FIG. 7, a detailed description thereof is omitted for the sake of brevity.

FIG. 9 is a modified example of the first operation mode timing of FIG. 7, and unlike FIG. 7, since all ADC circuits are enabled and operated in the LPD read section, power consumption for each read section may be differently adjusted.

FIG. 10 is a timing diagram of a second operation mode of an image sensing device, according to some exemplary embodiments.

Since the operation timing diagram of FIG. 10 is substantially the same as the operation timing diagram of FIG. 6 except for a second photodiode SPD read section RD_S, only the second photodiode SPD read section RD_S is described.

The charges overflowing from the second photodiode SPD to the second node FD2 at the exposure time EIT may be reset by applying the CS with a high level before the fifth time t5. The R3 may be output by reading the first node FD1 reset at the fifth time t5. By toggling the STG before the sixth time t6, the charges accumulated in the second photodiode SPD may be shared with the third node FD3, the second node FD2, and the first node FD1, and the SP3 may be output at the sixth time t6 by reading the voltage of the first node FD1 with the third conversion gain.

The charges overflowing from the second photodiode SPD in the exposure time and stored in the overflow capacitor OFC may be shared with the overflow capacitor OFC, the third node FD3, the second node FD2, and the first node FD1 by applying the CCS with a high level before the seventh time t7. At the seventh time t7, the SO4 may be output by reading the voltage of the first node FD1 with the fourth conversion gain. The overflow capacitor OFC, the third node FD3, the second node FD2, and the first node FD1 may be reset by toggling the RS before the eighth time t8. The R4 may be output by reading the voltage of the first node FD1 reset at the eighth time t8.

The ADC block 130 may sequentially receive the R3, the SO3, the SO4, and the R4 during the second photodiode SPD read section RD_S, may generate the third sub-digital signal SD3 by performing the complete CDS operation using the R3 and the SO3, and/or may generate the fourth sub-digital signal SD4 by performing the incomplete CDS operation using the SO4 and the R4.

Figure 11:
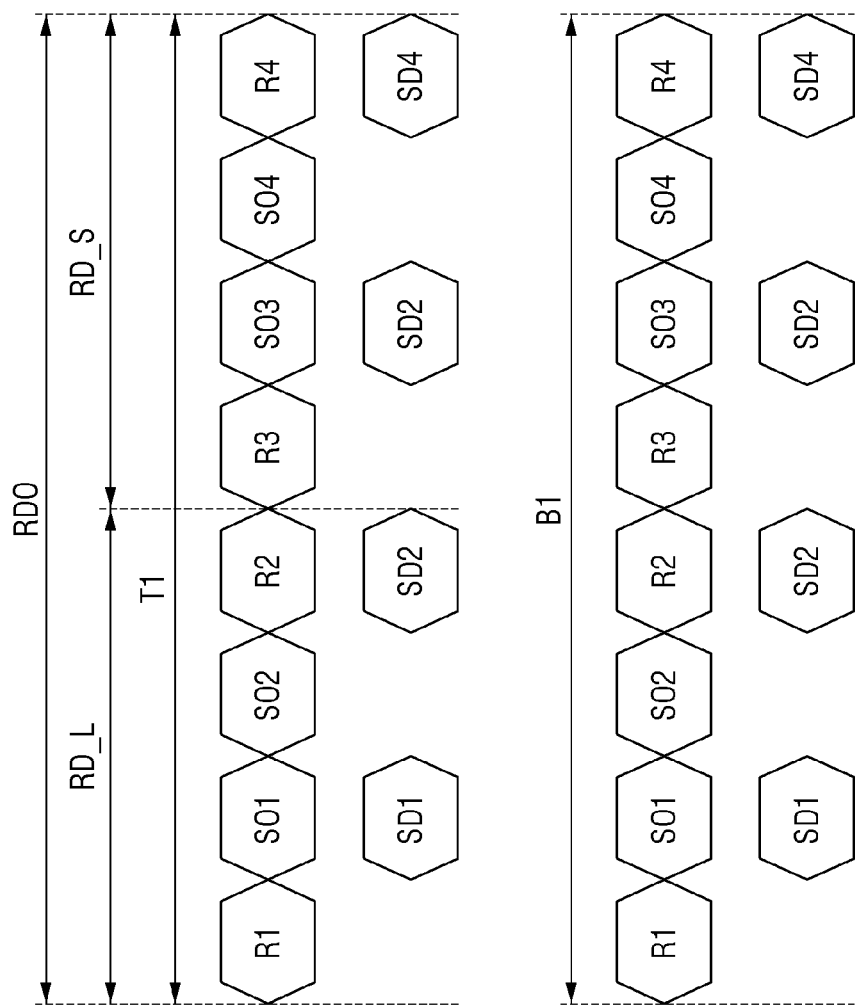
FIG. 11 illustrates an operation sequence of ADC circuits of the ADC block according to the timing diagram of FIG. 10, according to some exemplary embodiments.

FIG. 11 illustrates an operation sequence of ADC circuits of the ADC block according to the timing diagram of FIG. 10, according to some exemplary embodiments.

Referring to FIG. 11, in all read sections, only one ADC circuit may be enabled in the ADC block, and the first photodiode LPD and the second photodiode SPD may be read with two different conversion gains, respectively. Compared to the first operation mode of FIGS. 7 and 9, the number of enabled ADC circuits may be smaller, which may be advantageous in terms of power consumption. Since the charges that overflow from the second photodiode SPD may be reset before the third sub-output signal SO3 is read and exist at the third node FD3, the signal amount may be small compared to the third sub-output signal of the first operation mode.

Figure 12:
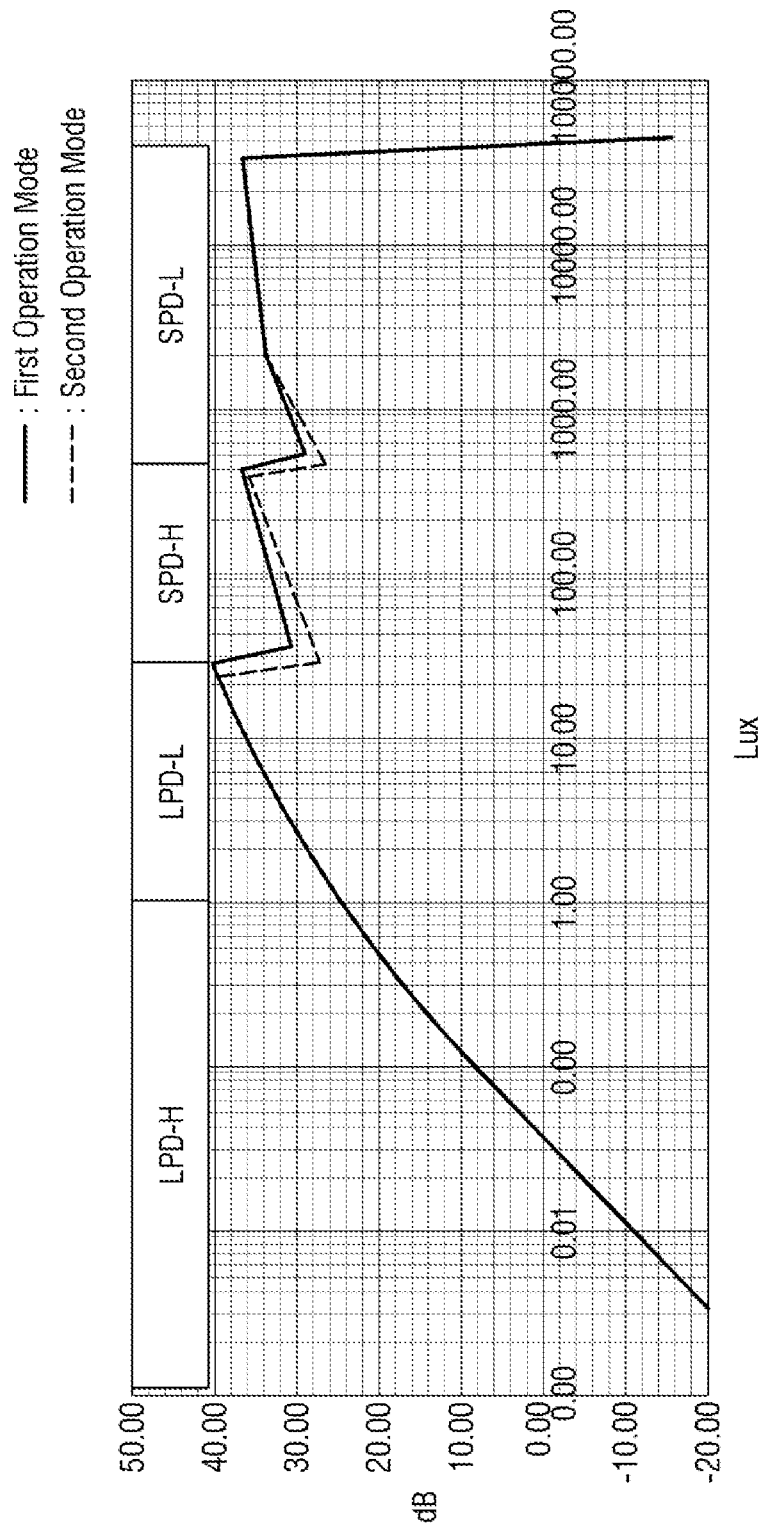
FIG. 12 is a graph illustrating illumination versus signal to noise ratio (SNR) of a pixel output signal, according to some exemplary embodiments.

FIG. 12 is a graph illustrating illumination versus signal to noise ratio (SNR) according to pixel operations, according to some exemplary embodiments.

Referring to FIG. 12, a solid line may indicate an operation in the first operation mode and a dotted line may indicate an operation in the second operation mode. LPD-H may indicate a graph according to a high conversion gain (HCG) operation, which may be the first conversion gain of the first photodiode LPD, LPD-L may indicate a graph according to a low conversion (LCG) operation, which may be the second conversion gain of the first photodiode LPD, SPD-H may indicate a graph according to an HCG operation, which may be the third conversion gain of the second photodiode SPD, and SPD-L may indicate a graph according to an LCG operation, which may be the fourth conversion gain of the second photodiode SPD.

As shown in FIG. 12, the SNR dip (e.g., decrease) when switching from LPD-L of the first photodiode LPD to SPD-H of the second photodiode SPD in the first operation mode may be improved compared to a corresponding SNR dip in the second operation mode. Alternatively or additionally, the SNR dip when switching from SPD-H of the second photodiode SPD to SPD-L of the second photodiode SPD may also be improved.

Figure 13:
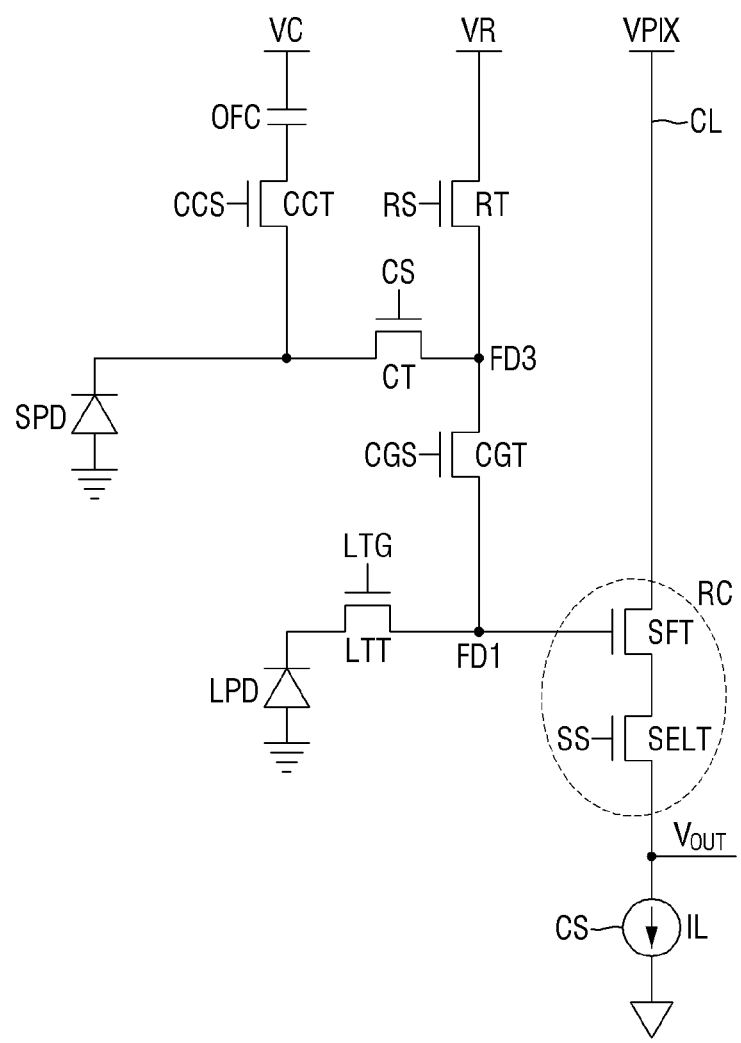
FIG. 13 is a circuit diagram of a unit pixel, according to some exemplary embodiments.

FIG. 13 is a pixel circuit diagram, according to some exemplary embodiments.

Referring to FIG. 13, a pixel circuit diagram UP-1 of FIG. 13 may include and/or may be similar in many respects to the pixel circuit diagram UP of FIG. 1, and may include additional features not mentioned above. For example, the pixel circuit UP-1 may omit the second transfer transistor STT. That is, the pixel circuit diagram of FIG. 13 may have a structure in which the second node FD2 of FIG. 1 may be omitted as a structure in which a cathode of the second photodiode SPD may be directly connected to the capacitor connection transistor CCT without going through the second transfer transistor (e.g., STT of FIG. 1). Since the pixel may operate only with the incomplete CDS when reading the charges generated by the second photodiode SPD, the second transfer transistor STT may be removed and the pixel may be implemented.

Figure 14:
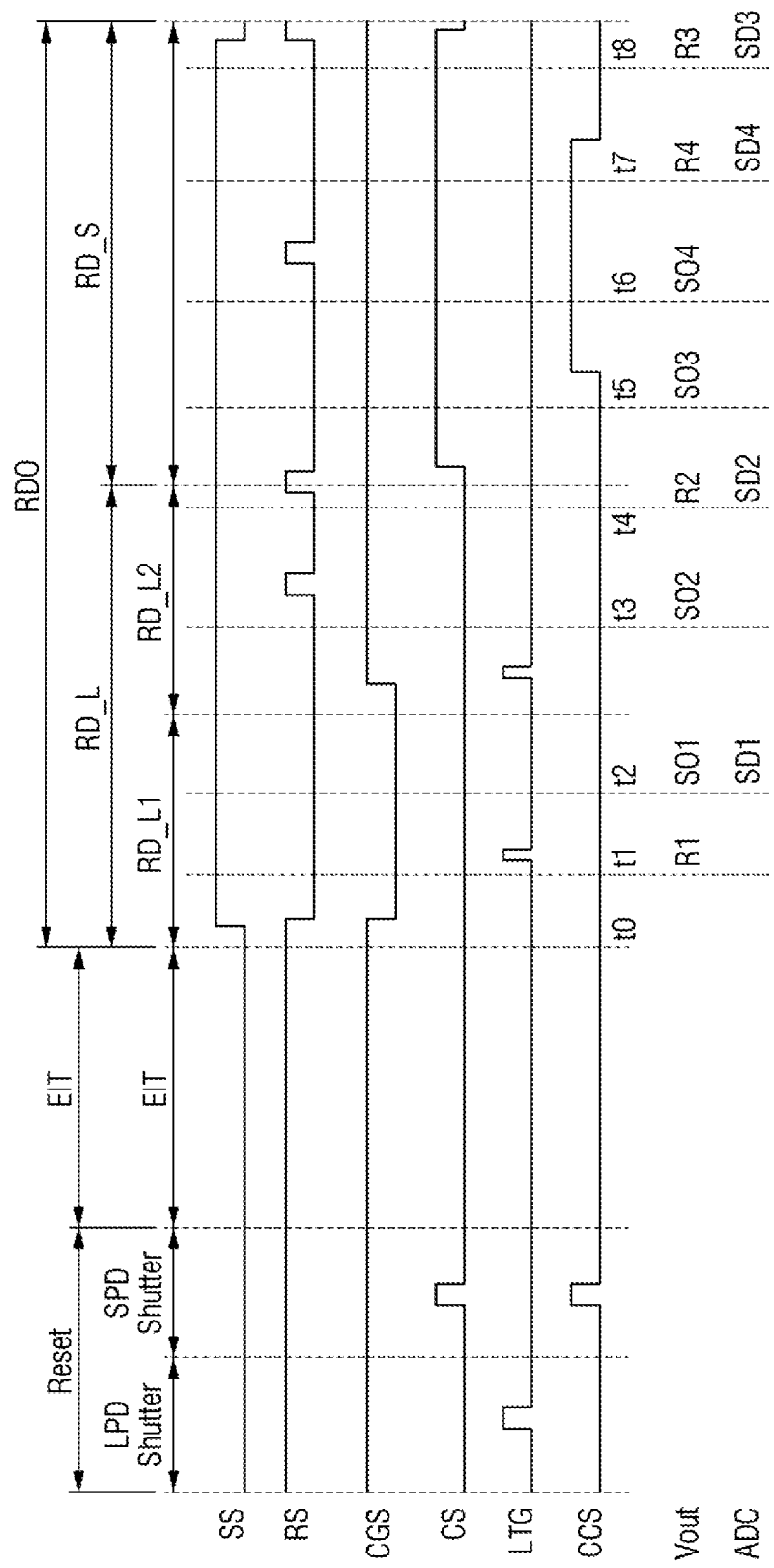
FIG. 14 is a timing diagram of a first operation mode of the unit pixel of FIG. 13, according to some exemplary embodiments.

FIG. 14 is a timing diagram when the pixel circuit diagram of FIG. 13 operates in the first operation mode, according to some exemplary embodiments.

Comparing FIG. 14 with FIG. 6, FIG. 14 may be substantially the same as FIG. 6 except that there is no STG control signal indicated in FIG. 14.

Before the fifth time t5, the CS may be applied with a high level, and accordingly, the connection transistor CT may be turned on so that the charges generated and accumulated by the second photodiode SPD may be shared with the third node FD3 and the first node FD1. At the fifth time t5, the read circuit RC, including the source follower transistor SFT, may convert the voltage of the first node FD1 into the third sub-output signal SO3 and may output the third sub-output signal SO3 to the column line. The capacitor connection transistor CCT may be turned on by applying the CCS with a high level before the sixth time t6, so that the charges accumulated in the overflow capacitor OFC are shared by the overflow capacitor OFC, the third node FD3, and the first node FD1.

At the sixth time t6, the read circuit RC, including the source follower transistor SFT, may convert the voltage of the first node FD1 into the fourth sub-output signal SO4 and may output the fourth sub-output signal SO4 to the column line. Before the seventh time t7, by toggling the RS and turning on the reset transistor RT, the OFC, the third node FD3, and the first node FD1 may be reset. At the seventh time t7, the voltage of the first node FD1 may be converted into the fourth reset signal R4 and output the fourth reset signal R4 to the column line. Before the eighth time t8, the CCS may be applied with a low level and the overflow capacitor OFC may be separated from the third node FD3 and the first node FD1. At the eighth time t8, the voltage of the first node FD1 may be converted into the third reset signal R3 and output the third reset signal R3 to the column line. The ADC block 130 may sequentially receive the SO3, the SO4, the R4, and the R3 during the second photodiode SPD read section RD_S, may generate the fourth sub-digital signal SD4 by performing the incomplete CDS operation using the SO4 and the R4, and may generate the third sub-digital signal SD3 by performing the incomplete CDS operation using the SO3 and the R3.

Figure 15:
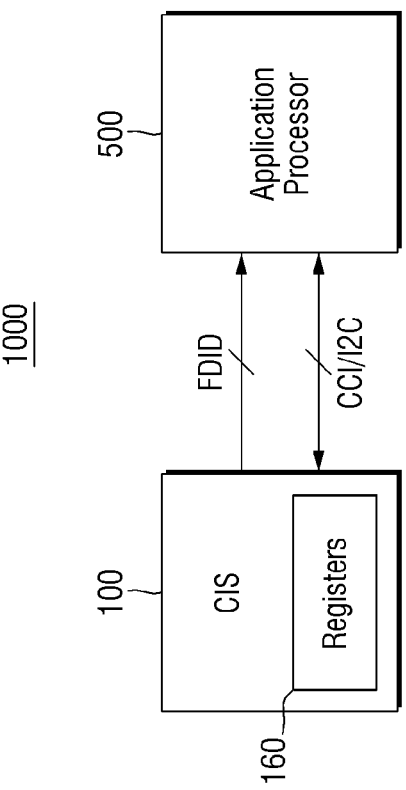
FIG. 15 is a block diagram of an electronic apparatus, according to some exemplary embodiments.

FIG. 15 is a block diagram of an electronic apparatus, according to some exemplary embodiments.

Referring to FIG. 15, an electronic apparatus 1000 may include an image sensing device 100 and an application processor 500. The image sensing device 100 may include and/or may be similar in many respects to at least one of the image sensing devices described above with reference to FIGS. 4A to 4C, and may include additional features not mentioned above. The image sensing device 100 may transmit a digital image signal FDID in units of frames through a display physical layer (DPHY) and/or camera physical layer (CPHY) interface conforming to a Mobile Industry Processor Interface (MIPI) standard, for example.

The application processor 500 may process the digital image signal FDID output in units of frames, and may determine an operation mode of the image sensing device 100 according to a surrounding environment of the electronic apparatus 1000. The application processor 500 may set the mode setting register 160 of the image sensing device 100 so that the pixels included in the image sensing device 100 operate in one of the first operation mode of FIG. 6 and/or the second operation mode of FIG. 10, according to ambient temperature information of the electronic apparatus 1000. That is, the application processor 500 may set, through a CCI and/or an I2C interface, the first operation mode so that the incomplete CDS may be performed twice when reading the charges generated by the second photodiode SPD, as shown in the timing diagram of FIG. 6 in a case in which the surrounding environment is higher than a set temperature condition. Alternatively or additionally, the application processor 500 may set, through the CCI and/or the I2C interface, the second operation mode in which the complete CDS and the incomplete CDS may be sequentially performed when reading the charges generated by the second photodiode SPD, as shown in the timing diagram of FIG. 10 in a case in which the surrounding environment is lower than the set temperature condition. The application processor 500 may set and change the operation mode according to the present disclosure by changing the setting value of the mode setting register 160 directly to the mode setting register 160 of FIG. 4A or 4B or through the FW register of FIG. 4C.

The application processor 500 may set the image sensing device 100 to operate in the first operation mode and/or the second operation mode by changing the register value even when it is necessary to adjust power consumption of the image sensing device 100, according to a power level of the electronic apparatus 1000. That is, when the image sensing device 100 operates in the second operation mode, as shown in FIGS. 10 and 11, the number of ADC circuits operating among the plurality of ADC circuits connected to each column line during the read section may be smaller than the number of ADC circuits operating in the first operation mode of FIG. 7. For example, when the power level of the electronic apparatus 1000 is low, power consumption of the electronic apparatus 1000 may be reduced by minimizing current consumption of the ADC block of the image sensing device 100.

Figure 16:
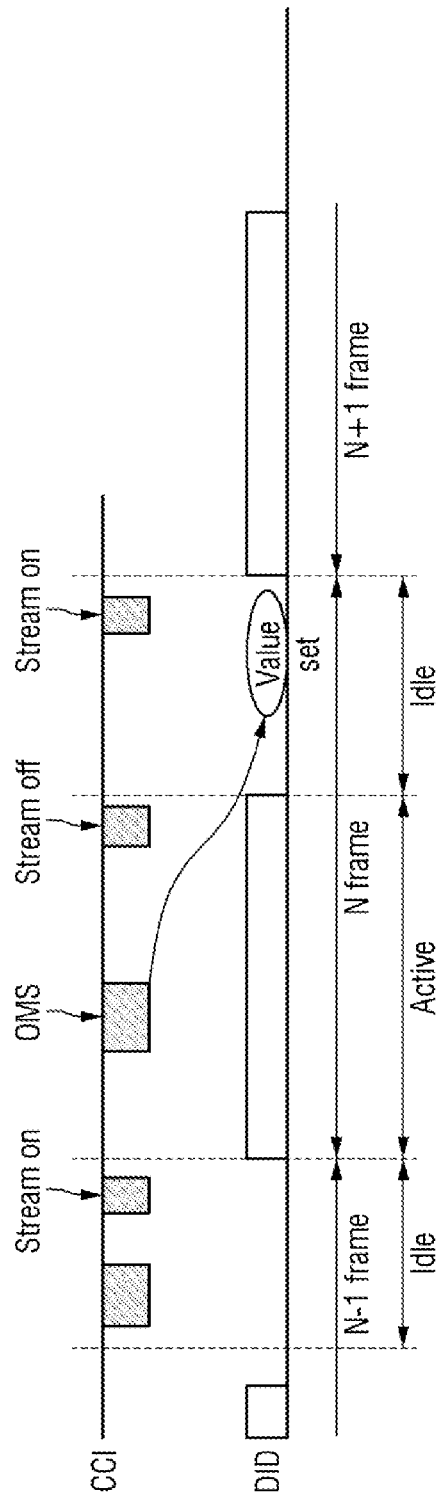
FIG. 16 is an operation timing diagram of the electronic apparatus of FIG. 15, according to some exemplary embodiments.

FIG. 16 is an example of an operation timing diagram of the electronic apparatus of FIG. 15, according to some exemplary embodiments.

Referring to FIG. 16, the AP 500 may transmit control signals (e.g., Stream on, Stream off, OMS) to the image sensing device 100 through the CCI, and in response to this, the image sensing device 100 may output the digital image FDID. As used herein, one frame period may include one active section (Active) and one idle section (Idle). The active section (Active) may be a section in which the image sensing device 100 may generate digital image data FDID in units of frames and may transmit the digital image data FDID to the application processor 500 in response to "Stream on" among the control signals. The idle section (Idle) may be a section in which image data may not be transmitted. The application processor 500 may transmit an operating mode set (OMS) to the CCI to change the operation mode of the next frame during the active section (Active). The image sensing device 100 may receive the OMS and change (value set) a setting value of the mode setting register 160 according to a value included in the OMS. The timing controller 150 of the image sensing device 100 may control the row driver 120 and the ADC block 130 to operate the pixel array 110 in the first or second operation mode according to the changed register value.

The image sensing device described above may provide a high dynamic range capable of expressing a strong high illumination environment and a low light environment such as under a tree or in a tunnel that may be included in a same image. A high-definition image signal and low-power operation may be provided by optimizing the operation mode of the pixel according to the image sensing device and/or the surrounding environment including the image sensing device.

It is to be understood that those skilled in the art may appreciate that many variations and modifications may be made to the embodiments without substantially departing from the principles of the present invention. Therefore, the disclosed embodiments of the present disclosure may be used in a generic and descriptive sense only and not for purposes of limitation.

What is claimed is:

1. An image sensing device, comprising:
a pixel array comprising a plurality of pixels, a capacitor, and a read circuit, the plurality of pixels comprising a first photodiode and a second photodiode, and the capacitor being coupled to the second photodiode;
a driver configured to generate control signals transmitted to the plurality of pixels;
an analog-to-digital converter (ADC) block configured to generate a digital signal by comparing output signals of the plurality of pixels with a ramp signal; and
a controller configured to control operations of the driver and the ADC block,
wherein a first light receiving area of the first photodiode is larger than a second light receiving area of the second photodiode, and
wherein at least one pixel of the plurality of pixels is configured to sequentially output:
a first sub-output signal obtained by converting first charges accumulated in the first photodiode with a first conversion gain;
a second sub-output signal obtained by converting the first charges accumulated in the first photodiode with a second conversion gain;
a third sub-output signal obtained by converting second charges accumulated in the second photodiode with a third conversion gain;
a fourth sub-output signal obtained by converting third charges stored in the capacitor with a fourth conversion gain;
a first reset signal corresponding to the fourth sub-output signal; and
a second reset signal corresponding to the third sub-output signal.

2. The image sensing device of claim 1, wherein the at least one pixel of the plurality of pixels is further configured to:
output a third reset signal corresponding to the first sub-output signal before outputting the first sub-output signal, and
output a fourth reset signal corresponding to the second sub-output signal after outputting the second sub-output signal.

3. The image sensing device of claim 1, wherein the at least one pixel of the plurality of pixels is further configured to:
output, before outputting the first sub-output signal, a third reset signal corresponding to the first sub-output signal and a fourth reset signal corresponding to the second sub-output signal.

4. The image sensing device of claim 1, wherein each pixel of the plurality of pixels comprises:
a first transfer transistor coupled to the first photodiode;
a second transfer transistor coupled to the second photodiode;
a conversion gain transistor disposed between the first transfer transistor and the second transfer transistor;
a connection transistor coupled in series with the conversion gain transistor between the first transfer transistor and the second transfer transistor; and
a plurality of floating regions comprising a first floating region, a second floating region, and a third floating region.

5. The image sensing device of claim 4, wherein:
the first conversion gain is formed by the first floating region being coupled to the read circuit and the conversion gain transistor,
the second conversion gain is formed by the first floating region and the second floating region in which the conversion gain transistor and the connection transistor are commonly connected, and
the third conversion gain is formed by the first floating region, the second floating region, and the third floating region in which the second transfer transistor and the connection transistor are commonly coupled.

6. The image sensing device of claim 5, wherein:
the capacitor is coupled to the third floating region through a capacitor connection transistor, and
the fourth conversion gain is formed by the plurality of floating regions and the capacitor.

7. The image sensing device of claim 6, wherein the third sub-output signal is generated by a voltage obtained by converting the second charges accumulated in the second photodiode and fourth charges accumulated in the third floating region with the third conversion gain by the read circuit.

8. The image sensing device of claim 6, wherein a first threshold voltage of the capacitor connection transistor is lower than a second threshold voltage of the connection transistor.

9. The image sensing device of claim 8, wherein:
the pixel array is disposed on a first semiconductor substrate,
the driver, the ADC block, and the controller are disposed on a second semiconductor substrate, and
the first semiconductor substrate and the second semiconductor substrate are stacked and coupled by a through silicon via (TSV).

10. The image sensing device of claim 1, wherein the ADC block comprises:
a first ADC block comprising a plurality of first ADC circuits respectively coupled through a plurality of first switches to first columns of the pixel array; and
a second ADC block comprising a plurality of second ADC circuits respectively coupled through a plurality of second switches to second columns of the pixel array.

11. The image sensing device of claim 10, wherein the ADC block is further configured to:
generates a first sub-digital signal by performing a first incomplete correlated double sampling (CDS) on the fourth sub-output signal and the first reset signal, and
generates a second sub-digital signal by performing a second incomplete CDS on the third sub-output signal and the second reset signal, and
wherein the digital signal comprises the first sub-digital signal and the second sub-digital signal.

12. The image sensing device of claim 11, wherein:
the at least one pixel of the plurality of pixels is further configured to:
output a third reset signal corresponding to the first sub-output signal, and
output a fourth reset signal corresponding to the second sub-output signal, the ADC block is further configured to:
generate a third sub-digital signal by performing a complete CDS using the third reset signal and the first sub-output signal, and
generate a fourth sub-digital signal by performing a third incomplete CDS on the second sub-output signal and the fourth reset signal,
wherein the digital signal further comprises the third sub-digital signal and the fourth sub-digital signal.

13. The image sensing device of claim 12, further comprising:
a signal processor configured to generate a final digital image signal by receiving and merging the first sub-digital signal, the second sub-digital signal, the third sub-digital signal, and the fourth sub-digital signal.

14. An image sensing device, comprising:
a pixel array comprising a plurality of pixels, a capacitor, and a read circuit, the plurality of pixels comprising a first photodiode and a second photodiode, a second light receiving area of the second photodiode being smaller than a first light receiving area of the first photodiode, and the capacitor being coupled to the second photodiode;
a driver configured to generate control signals transmitted to the plurality of pixels;

an analog-to-digital converter (ADC) block configured to generate a digital signal by comparing output signals of the plurality of pixels with a ramp signal;
a controller configured to control operations of the driver and the ADC block; and
an operation mode setting register,
wherein the controller is configured to:
generate control signals for controlling the driver and the ADC block according to a setting value of the operation mode setting register; and
control, when the setting value corresponds to a first operation mode, at least one pixel of the plurality of pixels to sequentially output:
a first sub-output signal obtained by converting first charges accumulated in the first photodiode with a first conversion gain;
a second sub-output signal obtained by converting the first charges accumulated in the first photodiode with a second conversion gain;
a third sub-output signal obtained by converting second charges accumulated in the second photodiode with a third conversion gain;
a fourth sub-output signal obtained by converting third charges stored in the capacitor with a fourth conversion gain;
a first reset signal corresponding to the fourth sub-output signal; and
a second reset signal corresponding to the third sub-output signal.

15. The image sensing device of claim 14, wherein the controller is further configured to:
control, when the setting value corresponds to a second operation mode, the at least one pixel of the plurality of pixels to sequentially output:
the first sub-output signal obtained by converting the first charges accumulated in the first photodiode with the first conversion gain;
the second sub-output signal obtained by converting the first charges accumulated in the first photodiode with the second conversion gain;
the second reset signal corresponding to the third sub-output signal obtained by converting the charges accumulated in the second photodiode with the third conversion gain;
the third sub-output signal;
the fourth sub-output signal obtained by converting the charges stored in the capacitor with the fourth conversion gain; and
the first reset signal corresponding to the fourth sub-output signal.

16. The image sensing device of claim 14, further comprising:
a temperature sensor,
wherein the controller is further configured to change, based on a temperature value obtained from the temperature sensor, the setting value of the operation mode setting register.

17. The image sensing device of claim 14, wherein the controller is further configured to:
change the setting value of the operation mode setting register through an interface coupled to outside of the image sensing device.

18. The image sensing device of claim 14, wherein the ADC block is further configured to:

generate a third sub-digital signal of the digital signal by performing a first incomplete correlated double sampling (CDS) on the third sub-output signal and the second reset signal; and generate a fourth sub-digital signal of the digital signal by performing an incomplete CDS on the fourth sub-output signal and the first reset signal.

19. The image sensing device of claim 18, wherein:

the at least one pixel of the plurality of pixels is configured to output a third reset signal corresponding to the first sub-output signal and a fourth reset signal corresponding to the second sub-output signal, and the ADC block is further configured to:

generate a first sub-digital signal of the digital signal by performing a complete CDS using the third reset signal and the first sub-output signal; and generate a second sub-digital signal of the digital signal by performing third incomplete CDS using the second sub-output signal and the fourth reset signal.

* * * * *